(12) United States Patent
Kawata et al.

(10) Patent No.: US 9,551,057 B2
(45) Date of Patent: Jan. 24, 2017

(54) GALVANNEALED LAYER AND STEEL SHEET COMPRISING THE SAME, AND METHOD FOR PRODUCING THE SAME

(75) Inventors: Hiroyuki Kawata, Tokyo (JP); Naoki Maruyama, Tokyo (JP); Akinobu Murasato, Tokyo (JP); Akinobu Minami, Tokyo (JP); Takeshi Yasui, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/235,155

(22) PCT Filed: Jul. 27, 2012

(86) PCT No.: PCT/JP2012/069229
§ 371 (c)(1),
(2), (4) Date: Jan. 27, 2014

(87) PCT Pub. No.: WO2013/018726
PCT Pub. Date: Feb. 7, 2013

(65) Prior Publication Data
US 2014/0193665 A1    Jul. 10, 2014

(30) Foreign Application Priority Data
Jul. 29, 2011    (JP) .................................. 2011-167779

(51) Int. Cl.
*B32B 15/00*    (2006.01)
*C23C 2/28*    (2006.01)
(Continued)

(52) U.S. Cl.
CPC .............. *C23C 2/28* (2013.01); *B32B 15/013* (2013.01); *C21D 8/0473* (2013.01);
(Continued)

(58) Field of Classification Search
None
See application file for complete search history.

(56) References Cited

U.S. PATENT DOCUMENTS 4,913,746 A * 4/1990 Marder et al. ................ 148/503
5,074,924 A * 12/1991 Ushioda et al. ............... 148/533
(Continued)

FOREIGN PATENT DOCUMENTS

CN      102046827      5/2011
JP      53-73431       6/1978
(Continued)

OTHER PUBLICATIONS

Gu et al. "Morphological changes of electrodeposited Zn and Zn—Fe coatings during heating", 1991, Journal of Materials Science, vol. 26, pp. 4588-4598.*
(Continued)

*Primary Examiner* — Humera Sheikh
*Assistant Examiner* — Seth Dumbris
(74) *Attorney, Agent, or Firm* — Birch, Stewart, Kolasch & Birch, LLP

(57) ABSTRACT

Provided are: a galvannealed steel sheet, improved in the adhesiveness of a plated layer with a base steel sheet, as a galvannealed steel sheet, prepared by using a high-strength steel sheet as a base material; and a method for producing the galvannealed steel sheet. A galvannealed layer is formed on the base steel sheet including a high-strength steel sheet having a predetermined composition. The average amount of Fe in the galvannealed layer is 8.0 to 12.0%. The absolute value of a difference (ΔFe) between the amount of Fe in the vicinity of an interface with the base steel sheet and the amount of Fe in the vicinity of the external surface of the plated layer in the plated layer is 0.0 to 3.0%.

12 Claims, 2 Drawing Sheets

(51) Int. Cl.
*C23C 2/06* (2006.01)
*B32B 15/01* (2006.01)
*C22C 18/00* (2006.01)
*C22C 38/00* (2006.01)
*C22C 38/02* (2006.01)
*C22C 38/04* (2006.01)
*C22C 38/06* (2006.01)
*C21D 8/04* (2006.01)

(52) U.S. Cl.
CPC ............ *C21D 8/0484* (2013.01); *C22C 18/00* (2013.01); *C22C 38/001* (2013.01); *C22C 38/002* (2013.01); *C22C 38/02* (2013.01); *C22C 38/04* (2013.01); *C22C 38/06* (2013.01); *C23C 2/06* (2013.01); *C21D 8/041* (2013.01); *C21D 2211/001* (2013.01); *C21D 2211/002* (2013.01); *C21D 2211/005* (2013.01); *C21D 2211/008* (2013.01); *Y10T 428/12611* (2015.01); *Y10T 428/12618* (2015.01); *Y10T 428/12799* (2015.01)

(56) References Cited

U.S. PATENT DOCUMENTS

| | | | |
|---|---|---|---|
| 6,596,414 B1 * | 7/2003 | Ishizuka et al. | ............. 428/659 |
| 2006/0269776 A1 * | 11/2006 | Tanaka | ...................... C23C 2/02 428/659 |
| 2011/0168300 A1 | 7/2011 | Moulin | |

FOREIGN PATENT DOCUMENTS

| JP | 01-246348 | 10/1989 | |
|---|---|---|---|
| JP | 03-243750 | 10/1991 | |
| JP | 05-311371 | 11/1993 | |
| JP | 06-235077 | 8/1994 | |
| JP | 08-296015 | 11/1996 | |
| JP | 09-013147 | 1/1997 | |
| JP | 09-111431 | 4/1997 | |
| JP | H10265924 | * 10/1998 | ............... C23C 2/06 |
| JP | 2001-207235 | 7/2001 | |
| JP | 2002-146503 | 5/2002 | |
| JP | 2002-173756 | 6/2002 | |
| JP | 2005-256041 | 9/2005 | |
| JP | 2007-302918 | 11/2007 | |
| JP | 2008-026678 | 2/2008 | |
| JP | 2008-127637 | 6/2008 | |
| JP | 2009-068061 | 4/2009 | |
| JP | 2011-132602 | 7/2011 | |
| WO | 90/02043 A1 | 3/1990 | |

OTHER PUBLICATIONS

Wienstroer et al., 2003, "Zinc/iron phase transformation studies on galvannealed steel coatings by X-ray diffraction", International Centre for Diffraction Data—Advances in X-ray Analysis, vol. 46, pp. 291-296.*
Peet, M.J., Jul. 2010, "Transformation and tempering of low-temperature banite", http://mathewpeet.org/thesis/superbainite/superbainite.html, accessed Feb. 25, 2016.*
International Search Report dated Oct. 30, 2012 issued in corresponding PCT Application No. PCT/JP2012/069229 [With English Translation].
Office Action issued on Oct. 23, 2015 in a corresponding Chinese Patent Application No. 201280036894.9.

* cited by examiner

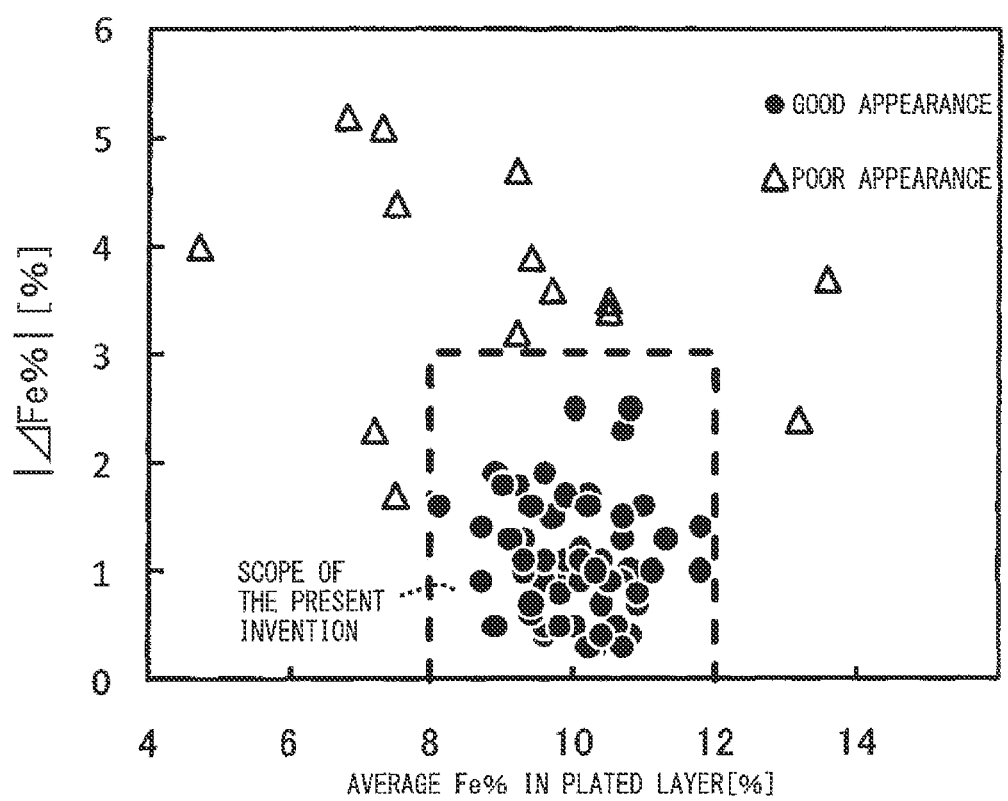

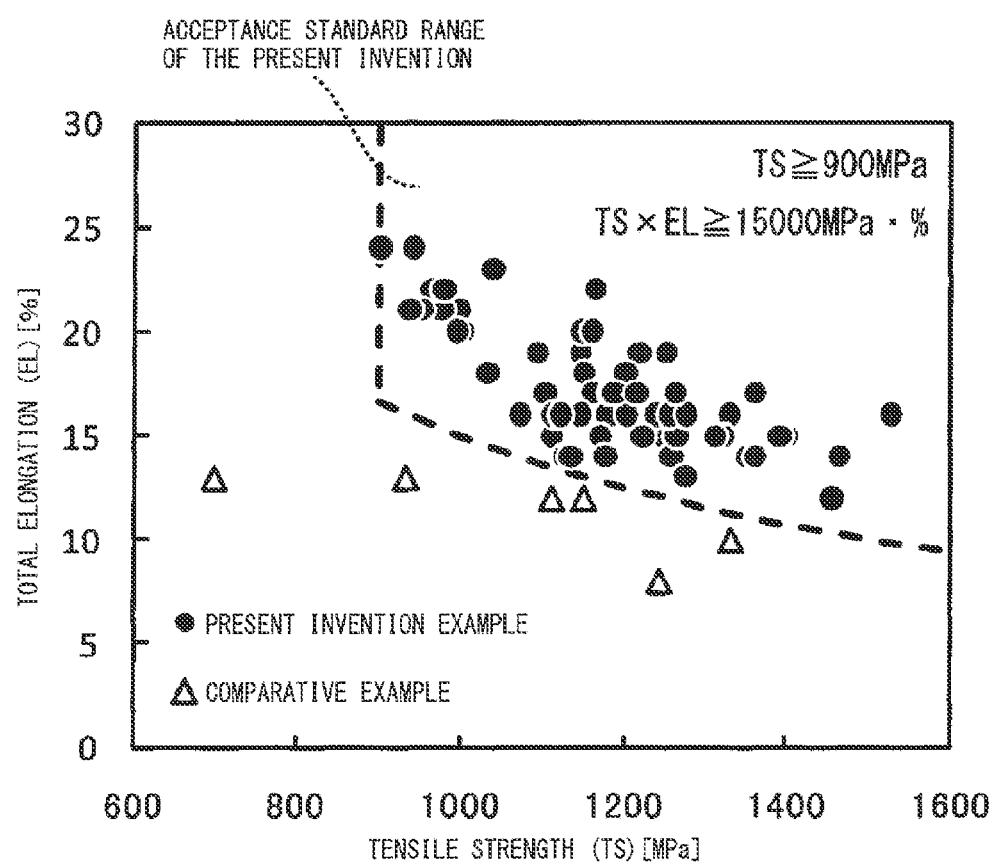

GALVANNEALED LAYER AND STEEL SHEET COMPRISING THE SAME, AND METHOD FOR PRODUCING THE SAME

This application is a national stage application of International Application No. PCT/JP2012/069229, filed Jul. 27, 2012, which claims priority to Japanese Application No. 2011-167779, filed Jul. 29, 2011, each of which is incorporated by reference in its entirety.

TECHNICAL FIELD

The present invention relates to a galvannealed layer and a plated steel sheet, the galvannealed layer being formed on a surface of a high-strength steel sheet as a base material. In particular, the present invention relates to a galvannealed layer and a plated steel sheet, improved in the adhesiveness of a galvanized layer with a base steel sheet, and to a method for producing the galvannealed layer.

BACKGROUND ART

In recent years, the higher strength of steel sheets used in various components and structures, such as automotive outside sheets (body sheets), construction machines, and, in addition, building and civil engineering structures, has been increasingly demanded, and a high-strength steel sheet with a maximum tensile stress of 900 MPa or more has also been used. Further, the steel sheets having such uses usually need excellent corrosion resistance because of often being used outdoors.

Conventionally, as steel sheets having such uses, hot dip galvanized steel sheets subjected to hot dip galvanizing have been widely used. Recently, there a galvannealed steel sheet subjected to alloying treatment including hot dip galvanizing, thereafter heating a plated layer to a temperature that is not less than the melting point of Zn to diffuse Fe from a base steel sheet into the plated layer, and forming the plated layer as a layer based on a Zn—Fe alloy has also been widely used. Such a galvannealed steel sheet is known to have excellent surface appearance and corrosion resistance, compared with a hot dip galvanized steel sheet that is not subjected to the alloying treatment.

However, in uses for automotive outside sheets and the like, the periphery of a sheet is usually subjected to severe bending working (hemming) by press working; and, in not only the automotive outside sheets but also in other uses, such a sheet, subjected to severe bending working, bore-expanding working, or the like by press working, is often used. In addition, when a conventional galvannealed steel sheet is subjected to severe bending working, bore-expanding working, or the like, a plated layer might peel from a base steel sheet in a portion worked in such a manner. When the plated layer peels off in such a manner, there is a problem that the corrosion resistance of an area where the plated layer peels off is lost to early corrode and rust the base steel sheet. Even when the plated layer does not peel off, lose of adhesiveness between the plated layer and the base steel sheet to produce even a few voids in an area where the adhesiveness is lost causes outside air and moisture to enter the voids, the anticorrosion function of the plated layer to be lost, and the base steel sheet to be early corroded and rusted in the same manner as described above. Thus, there has been a strong desire to develop a galvannealed layer and a plated steel sheet, having the excellent adhesiveness of the plated layer with a base steel sheet, for uses in which such severe bending working or the like is performed.

There have already been proposed various ways for improving the adhesiveness of a plated layer with a base steel sheet in a galvannealed steel sheet, and some examples thereof are described in Patent Literatures 1 to 8.

CITATION LIST

Patent Literature

[Patent Literature 1]Japanese Laid-open Patent Publication No. 2009-68061
[Patent Literature 2]Japanese Laid-open Patent Publication No. 2008-26678
[Patent Literature 3]Japanese Laid-open Patent Publication No. 2005-256041
[Patent Literature 4]Japanese Laid-open Patent Publication No. 2002-173756
[Patent Literature 5]Japanese Laid-open Patent Publication No. 9-13147
[Patent Literature 6]Japanese Laid-open Patent Publication No. 6-235077
[Patent Literature 7]Japanese Laid-open Patent Publication No. 2002-146503
[Patent Literature 8]Japanese Laid-open Patent Publication No. 5-311371

SUMMARY OF INVENTION

Technical Problem

As mentioned above, a galvannealed layer and a plated steel sheet, subjected to bending working or the like and used, desirably have the excellent adhesiveness of a plated layer with a base steel sheet; however, conventional manners for improving adhesiveness, as described in Patent Literatures 1 to 8, have been still insufficient, and it has been difficult to reliably and stably prevent the plated layer from peeling off particularly when the galvannealed layer and the plated steel sheet are subjected to very severe working such as hemming working or bore-expanding working and are used.

For example, Patent Literature 7 describes that the recesses and projections of a plating coating can be eliminated by bending working or the like prior to hot dip galvanizing. This is presumed to be because a large number of preferred nucleation sites are generated in a base material interface by bending working or the like prior to plating, to accelerate alloying. However, there is neither a description nor a suggestion that the concentration of Fe in a plated layer is controlled by bending working after a plating treatment step.

Further, Patent Literature 8 describes that an alloying rate can be improved by bending working in alloying by heating after plating. This is because Fe—Al—Zn which decreases a Fe—Zn alloying rate is cracked by bending working, to accelerate Fe—Zn alloying. However, temperature in alloying by heating is not described at all, and there is nether description nor suggestion that the concentration of Fe in a plated layer is controlled by adjusting temperature.

The present invention was accomplished with respect to the above circumstances as a background and is directed at providing a galvannealed layer and a plated steel sheet, reliably and sufficiently improved in the adhesiveness of a plated layer with a base steel sheet, as a galvannealed layer and a plated steel sheet, prepared by using a high-strength steel sheet as a base material and at providing a method for producing the galvannealed layer.

Solution to Problem

As a result of repeating various experiments and examinations of the adhesiveness of a plated layer in a galvannealed steel sheet, the present inventors found that in a hot dip galvanized layer that is alloyed, the concentration gradient of the amount of Fe in the thickness direction of the plated layer has a great influence on the adhesiveness of the plated layer with a base steel sheet. In other words, when the hot dip galvanized layer is subjected to alloying treatment, Fe diffuses from the inside of the base steel sheet into the plated layer and the plated layer has a Zn—Fe alloy-based structure; however, in this case, since the diffusion of Fe proceeds from a side closer to the base steel sheet, the concentration of Fe in the plated layer after the alloying treatment is usually higher in the side closer to the base steel sheet and lower in a side closer to the external surface of the plated layer. On the other hand, the Zn—Fe alloy that forms the alloyed galvanized layer is softer with decreasing the concentration of Fe but is brittler with increasing the concentration of Fe. Therefore, by decreasing the concentration of Fe in the vicinity of the external surface due to the concentration gradient of Fe as mentioned above, the external surface is softened during press working and therefore adheres to a die causing flaking. In contrast, when the concentration of Fe is increased in the vicinity of an interface with the base steel sheet due to the above-mentioned Fe concentration gradient to make the vicinity brittle, the plated layer is fractured in the region by severe working, easily causing powdering.

As a result of further pursuing experiments and examinations based on such findings, it was found that, by performing treatment in which Fe in a plated layer is diffused in the layer while preventing Fe from diffusing from a base steel sheet into the plated layer as much as possible after alloying treatment of a hot dip galvanized layer, the concentration gradient of Fe in the plated layer can be reduced (the gradient of the concentration of Fe is flattened) to equalize the concentration of Fe in the plated layer to optimal concentration (around 10%), at which peeling resistance is excellent, in any portion in the thickness direction thereof, to thereby more greatly improve the adhesiveness of the galvannealed layer with the base steel sheet than ever before, and the present invention was thus accomplished.

The present invention was accomplished based on such novel findings as described above and is to basically provide a galvannealed layer and a plated steel sheet, improved in the adhesiveness of the plated layer with a base steel sheet, by flattening the concentration gradient of Fe in the plated layer of the plated steel sheet in which the galvannealed layer is formed on a surface of a high-strength steel sheet as a base material. Further, the present invention is to provide a method for producing a galvannealed layer, including a treatment step for reducing the concentration gradient of Fe in a hot dip galvanized layer.

Accordingly, the present invention is summarized as follows:

(1) A galvannealed layer formed on a surface of a base steel sheet, wherein the average amount of Fe in the galvannealed layer is in a range of 8.0 to 12.0%; and the absolute value of a difference ΔFe between the amount of Fe at a position of ⅛ of the thickness of the plated layer (the amount of Fe in the vicinity of an internal side) and the amount of Fe at a position of ⅞ of the thickness of the plated layer (the amount of Fe in the vicinity of an external side) in the galvannealed layer, the thickness being from an interface between the galvannealed layer and the base steel sheet to the external surface of the plated layer, is in a range of 0.0 to 3.0%.

(2) A galvannealed steel sheet, wherein the galvannealed layer according to (1) is formed on a surface of a base steel sheet including, in mass %,
C: 0.050 to 0.300%,
Si: 0.10 to 2.50%,
Mn: 0.50 to 3.50%,
P: 0.001 to 0.030%,
S: 0.0001 to 0.0100%,
Al: 0.005 to 1.500%,
O: 0.0001 to 0.0100%,
N: 0.0001 to 0.0100%, and
the balance of Fe and unavoidable impurities.

(3) The galvannealed steel sheet according to the above (2), wherein the base steel sheet further includes, in mass %, one or two or more selected from
Cr: 0.01 to 2.00%,
Ni: 0.01 to 2.00%,
Cu: 0.01 to 2.00%,
Ti: 0.005 to 0.150%,
Nb: 0.005 to 0.150%,
V: 0.005 to 0.150%,
Mo: 0.01 to 1.00%, and
B: 0.0001 to 0.0100%.

(4) The galvannealed steel sheet according to the above (2) or (3), wherein the base steel sheet further includes 0.0001 to 0.5000% in total of one or two or more selected from Ca, Ce, Mg, Zr, Hf, and REM.

(5) The galvannealed steel sheet according to any of the above (2) to (4), wherein a coating including a P oxide and/or a complex oxide containing P is formed on a surface of the galvannealed layer.

(6) A method for producing a galvannealed layer, including: in mass %,
a hot dip galvanizing step for subjecting a surface of a base steel sheet to hot dip galvanizing to obtain a hot dip galvanized steel sheet;
an alloying treatment step for heating a hot dip galvanized layer, formed in the hot dip galvanizing step, to a temperature in a range of 470 to 650° C. to form a galvannealed layer and to produce a galvannealed steel sheet; and
an intra-galvannealed-layer diffusion treatment step for, after the alloying treatment step, allowing the galvannealed steel sheet to stay at a temperature in a range of 250 to 450° C. and subjecting the galvannealed steel sheet to one or more times of bending-unbending working in the temperature range to diffuse Fe in the galvannealed layer.

(7) The method for producing a galvannealed layer according to the above (6), wherein the galvannealed steel sheet is obtained, in which, after the intra-galvannealed-layer diffusion treatment step, the average amount of Fe in the galvannealed layer is in a range of 8.0 to 12.0%; and the absolute value of a difference ΔFe between the amount of Fe at a position of ⅛ of the thickness of the plated layer (the amount of Fe in the vicinity of an internal side) and the amount of Fe at a position of ⅞ of the thickness of the plated layer (the amount of Fe in the vicinity of an external side) in the galvannealed layer, the thickness being from an interface between the galvannealed layer and the base steel sheet to the external surface of the plated layer, is in a range of 0.0 to 3.0%.

(8) The method for producing a galvannealed layer according to the above (6) or (7), wherein in the intragalvannealed-layer diffusion treatment step, the bending working is performed so that a maximum tensile strain amount in a surface of the steel sheet ranges from 0.0007 to 0.0910.

(9) The method for producing a galvannealed steel sheet according to any of the above (6) to (8), wherein a surface of the galvannealed layer is subjected to phosphate coating treatment for forming a coating including a P oxide and/or a complex oxide containing P after the intra-galvannealed-layer diffusion treatment step.

(10) The method for producing a galvannealed layer according to any of (6) to (9), wherein a base steel sheet including, in mass %,
C: 0.050 to 0.300%,
Si: 0.10 to 2.50%,
Mn: 0.50 to 3.50%,
P: 0.001 to 0.030%,
S: 0.0001 to 0.0100%,
Al: 0.005 to 1.500%,
O: 0.0001 to 0.0100%,
N: 0.0001 to 0.0100%, and
the balance of Fe and unavoidable impurities is used as the base steel sheet.

(11) The method for producing a galvannealed layer according to the above (10), wherein the steel sheet further including, in mass %, one or two or more selected from
Cr: 0.01 to 2.00%,
Ni: 0.01 to 2.00%,
Cu: 0.01 to 2.00%,
Ti: 0.005 to 0.150%,
Nb: 0.005 to 0.150%,
V: 0.005 to 0.150%,
Mo: 0.01 to 1.00%, and
B: 0.0001 to 0.0100%
is used as the base steel sheet.

(12) The method for producing a galvannealed layer according to any of the above (10) to (11), wherein the steel sheet further including, in mass %, 0.0001 to 0.5000% in total of one or two or more selected from Ca, Ce, Mg, Zr, Hf, and REM is used as the base steel sheet.

Advantageous Effects of Invention

In accordance with the present invention, a galvanized layer and a plated steel sheet, reliably and sufficiently improved in the adhesiveness of a plated layer with a base steel sheet, can be obtained as a galvannealed layer and a plated steel sheet, in which a steel sheet, particularly a high-strength steel sheet is used as a base material, and therefore, the plated layer can be effectively prevented from being fractured and peeling even in uses subjected to severe working such as bending working or bore-expanding working.

BRIEF DESCRIPTION OF DRAWINGS

FIG. 1 is a graph that indicates a relationship of the average amount of Fe and the absolute value of the amount of ΔFe in a plated layer and the appearance of the plated layer.

FIG. 2 is a graph that indicates a relationship between tensile strength and an elongation in the galvannealed steel sheet according to the present invention.

DESCRIPTION OF EMBODIMENTS

The present invention will be explained in detail below.
In the galvannealed layer and plated steel sheet of the present invention, basically, a high-strength steel sheet having a predetermined component composition is used as a base material and a galvannealed layer is formed on the surface of the base steel sheet. In addition, particularly as for the galvannealed layer, not only the average amount of Fe in the plated layer is specified but also a Fe concentration distribution (Fe concentration gradient) in the thickness direction of the plated layer is specified.

In other words, the galvannealed layer is an alloy layer formed by alloying treatment including forming a Zn plated layer on the surface of the base steel sheet by hot dip galvanizing and thereafter reheating the plated layer to a temperature that is not less than the melting point of Zn to diffuse Fe in the base steel sheet in the plated layer and has a structure based on a Zn—Fe alloy. In the present invention, the average amount of Fe in the galvannealed layer is, in mass %, in the range of 8.0 to 12.0%, and the absolute value of the difference ΔFe between the amount of Fe in the vicinity of the external side and the amount of Fe in the vicinity of the internal side is specified in the range of 0.0 to 3.0% as a Fe concentration gradient condition in the thickness direction in the galvannealed layer. Thus, the limitation reasons of the conditions will be explained.

[Average Amount of Fe in Plated Layer: 8.0 to 12.0%]

When the average amount of Fe in the galvannealed layer is less than 8.0%, the plated layer becomes soft and easily adheres to a die for press working, and therefore, flaking (flaky peeling) easily occurs during press working. Thus, the average amount of Fe in the plated layer is preferably 8.0% or more from the viewpoint of flaking resistance. Preferably, the average amount of Fe is 9.0% or more. On the other hand, the average amount of Fe in the galvannealed layer is more than 12.0%, the plated layer becomes brittle and is easily fractured, and powdering (powdery peeling) easily occurs during press working. Thus, the average amount of Fe in the plated layer is preferably 12.0% or less from the viewpoint of powdering resistance. Preferably, the average amount of Fe is 11.0% or less. Thus, an average Fe concentration in a range of 8.0 to 12.0%, preferably in a range of 9.0 to 11.0%, causes both flaking and powdering to hardly occur and the adhesiveness of the plated layer to become good.

[Condition of Fe Concentration Gradient in Plated Layer: Absolute Value of ΔFe of 0.0 to 3.0%]

As mentioned above, in a hot dip galvanized layer subjected to alloying treatment, a Fe concentration gradient usually exists in the thickness direction thereof. In the Fe concentration gradient, there is a general tendency for the concentration of Fe to be high in the vicinity of an interface with a base steel sheet and for the concentration of Fe to be low in the vicinity of the external surface of the plated layer. In a region in the vicinity of the surface, in which the concentration of Fe is low, the plated layer becomes soft to adhere to a die during press working and flaking peeling easily occurs. On the other hand, in the vicinity of the interface with the base steel sheet, in which the concentration of Fe is low, the plated layer becomes brittle and powdering peeling easily occurs. Accordingly, in any case, peeling of the plated layer easily occurs when severe working is performed. Thus, in the present invention, the Fe concentration gradient in the plated layer is reduced to specify a Fe concentration gradient condition so that the optimal concentration of Fe (8.0 to 12.0%, preferably 9.0 to 11.0%) at which flaking or powdering hardly occurs in any portion in the thickness direction thereof is achieved. In other words, it is specified that the absolute value of the difference ΔFe between the amount of Fe in the vicinity of the interface with the base steel sheet (the amount of Fe in the vicinity of the internal side) and the amount of Fe in the vicinity of the external surface of the plated layer (the amount of Fe in the vicinity of the external side) is in the range of 0.0 to 3.0%. The amount of Fe in the vicinity of the internal side means the amount of Fe at the position of ⅛ of the total thickness of the plated layer from the interface with the base steel sheet to the external surface of the plated layer, while the amount of Fe in the vicinity of the external side means the amount of Fe at the position of ⅞ of the total thickness of the plated layer from the interface with the base steel sheet to the external surface of the plated layer (i.e., the position of ⅛ of the total thickness of the plated layer from the external surface of the plated layer to the interface with the base steel sheet).

The absolute value of ΔFe of more than 3.0% results in the insufficient effect of improving the adhesiveness of the plated layer. Thus, it is specified that the absolute value of ΔFe is in the range of 0.0 to 3.0%. The absolute value of ΔFe of 3.0% or less results in less possibility that peeling due to flaking or powdering occurs in the plated layer even when severe working is performed, so that the adhesiveness of the plated layer is improved. In addition, for more reliably obtaining the adhesiveness improvement effect, the absolute value of ΔFe is preferably 2.0% or less, further more preferably 1.5% or less.

In addition, the coating amount of the galvannealed layer is not particularly limited but is desirably 20 g/m² or more from the viewpoint of corrosion resistance and 150 g/m² or less from the viewpoint of economical efficiency.

Furthermore, the galvannealed layer is prepared by alloying Fe based on Zn; however, even when the galvannealed layer contains Zn and Fe as well as a small amount of one or two or more of Al, Pb, Sb, Si, Sn, Mg, Mn, Ni, Cr, Co, Ca, Cu, Li, Ti, Be, Bi, Sr, I, Cs, and REM, the effects of the present invention are not deteriorated and a preferable effect such as improvement of corrosion resistance or workability may be provided depending on the amount.

The limitation reasons of the component composition of the steel sheet used as the base material for the galvannealed steel sheet of the present invention will be explained below. In the following description, all "%" represents mass %.

[C: 0.050 to 0.300%]

C is contained for increasing the strength of a high-strength steel sheet. However, a C content of more than 0.300% results in insufficient weldability. The content of C is preferably 0.250% or less, more preferably 0.220% or less, from the viewpoint of weldability. On the other hand, a C content of less than 0.050% results in decreased strength and precludes securing of a maximum tensile strength of 900 MPa or more. The content of C is preferably 0.075% or more, more preferably 0.100% or more, for more further enhancing strength.

[Si: 0.10 to 2.50%]

Si is an element that suppresses generation of an iron-based carbide in a steel sheet and enhances strength and moldability. However, a Si content of more than 2.50% results in embrittlement of the steel sheet and in deterioration of ductility. The content of Si is preferably 2.20% or less, more preferably 2.00% or less, from the viewpoint of ductility. On the other hand, a Si content of less than 0.10% results in generation of a large amount of coarse iron-based carbide during alloying treatment of a plated layer and in deterioration of strength and moldability. From the viewpoint of the above, the lower limit of Si is preferably 0.30% or more, more preferably 0.45% or more.

[Mn: 0.50 to 3.50%]

Mn is added for enhancing the strength of a steel sheet. However, a Mn content of more than 3.50% results in generation of a coarse Mn-concentrated unit in the center in the sheet thickness of the steel sheet to cause embrittlement to easily occur and to cause a trouble such as braking of a cast slab to easily occur. A Mn content of more than 3.50% also results in deterioration of weldability. Accordingly, the content of Mn is preferably 3.50% or less. The content of Mn is preferably 3.20% or less, more preferably 3.00% or less, from the viewpoint of weldability. On the other hand, since a Mn content of less than 0.50% results in formation of a large amount of soft structure during cooling after annealing, to thereby preclude securing of a maximum tensile strength of 900 MPa or more, the content of Mn is preferably 0.50% or more. The content of Mn is preferably 1.50% or more, more preferably 1.70% or more, for further enhancing strength.

[P: 0.001 to 0.030%]

P tends to segregate in the center in the sheet thickness of a steel sheet and embrittles a weld. Since a P content of more than 0.030% results in great embrittlement of the weld, the upper limit of the content of P is 0.030%. On the other hand, since a P content of less than 0.001% results in a greatly increased production cost, the lower limit thereof is 0.001%.

[S: 0.0001 to 0.0100%]

S adversely affects weldability as well as productability in casting and hot rolling. Thus, the upper limit of the content of S is 0.0100% or less. Further, S is bound to Mn to form MnS which is coarse and to deteriorate ductility and stretch flanging properties and is therefore preferably 0.0050% or less, more preferably 0.0025% or less. On the other hand, since a S content of less than 0.0001% results in a greatly increased production cost, the lower limit thereof is 0.0001%.

[Al: 0.005 to 1.500%]

Al suppresses generation of an iron-based carbide and enhances the strength and moldability of a steel sheet. However, an Al content of more than 1.500% results in deteriorated weldability and the upper limit of the content of Al is therefore 1.500%. From the viewpoint of the above, the content of Al is preferably 1.200% or less, more preferably 0.900% or less. Al is also an element that is effective as a deoxidation material; however, since an Al content of less than 0.005% results in an insufficient effect as the deoxidation material, the lower limit of the content of Al is 0.005%. The amount of Al is preferably 0.010% or more for more sufficiently obtaining a deoxidation effect.

[N: 0.0001 to 0.0100%]

Since N forms a coarse nitride and deteriorates ductility and stretch flanging properties, the amount of added N is preferably reduced. Since a N content of more than 0.0100% results in the significant tendency of the above, the upper limit of the content of N is 0.0100%. Since N also causes generation of blowholes in welding, the lower content thereof is better. The effects of the present invention are exerted even when the lower limit of the content of N is not particularly specified; however, since a N content of less than 0.0001% results in a greatly increased production cost, the N content is 0.0001% or more.

[O: 0.0001 to 0.0100%]

Since O forms an oxide and deteriorates ductility and stretch flanging properties, the content thereof is preferably reduced. Since an O content of more than 0.0100% results in significant deterioration of stretch flanging properties, the upper limit of the content of O is 0.0100%. Furthermore, the content of O is preferably 0.0080% or less, more preferably 0.0060% or less. The effects of the present invention are exerted even when the lower limit of the content of O is not particularly specified; however, since an O content of less than 0.0001% results in a greatly increased production cost, the lower limit is 0.0001%.

In addition, elements described below may be optionally added to the base steel sheet for the galvannealed steel sheet of the present invention.

[Cr: 0.01 to 2.00%]

Cr is an element that suppresses phase transformation at high temperature and is effective for higher strength and may be added instead of part of C and/or Mn. Since a Cr content of more than 2.00% results in deteriorated hot workability to reduce productivity, the content of Cr is 2.00% or less. Although the effects of the present invention are exerted even when the lower limit of the content of Cr is not particularly specified, the content of Cr is preferably 0.01% or more for sufficiently obtaining the effect of achieving higher strength by adding Cr.

[Ni: 0.01 to 2.00%]

Ni is an element that suppresses phase transformation at high temperature and is effective for higher strength and may be added instead of part of C and/or Mn. Since a Ni content of more than 2.00% results in deteriorated weldability, the content of Ni is 2.00% or less. Although the effects of the present invention are exerted even when the lower limit of the content of Ni is not particularly specified, the content of Ni is preferably 0.01% or more for sufficiently obtaining the effect of achieving higher strength by adding Ni.

[Cu: 0.01 to 2.00%]

Cu is an element that exists as fine particles in a steel to thereby enhance strength and can be added instead of part of C and/or Mn. Since a Cu content of more than 2.00% results in deteriorated weldability, the content of Cu is 2.00% or less. Although the effects of the present invention are exerted even when the lower limit of the content of Cu is not particularly specified, the content of Cu is preferably 0.01% or more for sufficiently obtaining the effect of achieving higher strength by adding Cu.

[Ti: 0.005 to 0.150%]

Ti is an element that contributes to increase in the strength of a steel sheet by precipitate strengthening, fine grain strengthening due to suppression of ferrite crystal grain growth, and dislocation strengthening through suppression of recrystallization. However, since a Ti content of more than 0.150% results in increase in precipitated carbonitrides to deteriorate moldability, the content of Ti is 0.150% or less. The content of Ti is more preferably 0.100% or less, further preferably 0.070% or less, from the viewpoint of moldability. Although the effects of the present invention are exerted even when the lower limit of the content of Ti is not particularly specified, the content of Ti is preferably 0.005% or more for sufficiently obtaining the effect of increasing strength by adding Ti. The content of Ti is more preferably 0.010% or more, further preferably 0.015% or more, for further achieving the higher strength of the steel sheet.

[Nb: 0.005 to 0.150%]

Nb is an element that contributes to increase in the strength of a steel sheet by precipitate strengthening, fine grain strengthening due to suppression of ferrite crystal grain growth, and dislocation strengthening through suppression of recrystallization. However, since a Nb content of more than 0.150% results in increase in precipitated carbonitrides to deteriorate moldability, the content of Nb is 0.150% or less. The content of Nb is more preferably 0.100% or less, further preferably 0.060% or less, from the viewpoint of moldability. Although the effects of the present invention are exerted even when the lower limit of the content of Nb is not particularly specified, the content of Nb is preferably 0.005% or more for sufficiently obtaining the effect of increasing strength by adding Nb. The content of Nb is more preferably 0.010% or more, further preferably 0.015% or more, for further achieving the higher strength of the steel sheet.

[V: 0.005 to 0.150%]

V is an element that contributes to increase in the strength of a steel sheet by precipitate strengthening, fine grain strengthening due to suppression of ferrite crystal grain growth, and dislocation strengthening through suppression of recrystallization. However, since a V content of more than 0.150% results in an increase in precipitated carbonitrides to deteriorate moldability, the content of V is 0.150% or less. Although the effects of the present invention are exerted even when the lower limit of the content of V is not particularly specified, the content of V is preferably 0.005% or more for sufficiently obtaining the effect of increasing strength by adding V.

[Mo: 0.01 to 1.00%]

Mo is an element that suppresses phase transformation at high temperature and is effective for higher strength and may be added instead of part of C and/or Mn. Since a Mo content of more than 1.00% results in deteriorated hot workability to reduce productivity, the content of Mo is 1.00% or less. Although the effects of the present invention are exerted even when the lower limit of the content of Mo is not particularly specified, the content of Mo is preferably 0.01% or more for sufficiently obtaining the effect of achieving higher strength by adding Mo.

[W: 0.01 to 1.00%]

W is an element that suppresses phase transformation at high temperature and is effective for higher strength and may be added instead of part of C and/or Mn. Since a W content of more than 1.00% results in deteriorated hot workability to reduce productivity, the content of W is preferably 1.00% or less. Although the effects of the present invention are exerted without particularly specifying the lower limit of the content of W, the content of W is preferably 0.01% or more for sufficiently obtaining higher strength due to W.

[B: 0.0001 to 0.0100%]

B is an element that suppresses phase transformation at high temperature and is effective for higher strength and may be added instead of part of C and/or Mn. Since a B content of more than 0.0100% results in deteriorated hot workability to reduce productivity, the content of B is 0.0100% or less. The content of B is more preferably 0.0050% or less, further preferably 0.0030% or less, from the viewpoint of productivity. Although the effects of the present invention are exerted even when the lower limit of the content of B is not particularly specified, the content of B is preferably 0.0001% or more for sufficiently obtaining the effect of achieving higher strength by adding B. The content of B is more preferably 0.0003% or more, more preferably 0.0005% or more, for further higher strength.

Furthermore, 0.0001 to 0.5000% in total of one or two or more of Ca, Ce, Mg, Zr, Hf, and REM as additional elements may be added to the base steel sheet in the galvannealed steel sheet of the present invention. The reason of adding the elements is as described below.

Ca, Ce, Mg, Zr, Hf, and REM are elements effective for improving moldability and one or two or more thereof can be added. However, since a total of the contents of one or two or more of Ca, Ce, Mg, Zr, Hf, and REM of more than 0.5000% may rather result in deteriorated ductility, the total of the contents of the respective elements is preferably 0.5000% or less. Although the effects of the present invention are exerted even when the lower limit of the content of one or two or more of Ca, Ce, Mg, Zr, Hf, and REM is not particularly specified, the total of the contents of the respective elements is preferably 0.0001% or more for sufficiently obtaining the effect of improving the moldability of a steel sheet. The total of the contents of one or two or more of Ca, Ce, Mg, Zr, Hf, and REM is preferably 0.0005% or more, further preferably 0.0010% or more, from the viewpoint of moldability. REM is an abbreviation for Rare Earth Metal and refers to an element belonging to the lanthanide series. In the present invention, REM and Ce are often added in a misch metal, which may contain a lanthanide series element as well as La and Ce in a complex. The effects of the present invention are exerted even when the lanthanide series element as well as La and Ce described above are contained as unavoidable impurities. Further, the effects of the present invention are exerted even when metal La and Ce are added.

The balance other than the above respective elements may be Fe and unavoidable impurities. In addition, each of Cr, Ni, Cu, Ti, Nb, V, Mo, W, and B mentioned above may be contained as an impurity in a minute amount less than the lower limit thereof. Ca, Ce, Mg, Zr, Hf, and REM may also be contained as impurities in a trace amount less than the lower limit of the total amount thereof.

The structure of the high-strength steel sheet used as the base material for the galvannealed steel sheet of the present invention will be explained below.

The high-strength steel sheet used as the base material for the galvannealed steel sheet of the present invention preferably includes, by volume fraction, ferrite: 10 to 75%, bainitic ferrite and/or bainite: 10 to 50%, tempered martensite: 10 to 50%, fresh martensite: 15% or less, and retained austenite: 20% or less as the microstructures thereof in the range of $1/8$ to $3/8$ of a sheet thickness assuming that $1/4$ of the thickness is a center. When the high-strength steel sheet as the base material has such structures, the galvannealed steel sheet having superior moldability is made. Thus, the preferred conditions of each of the structures will be explained below.

[Ferrite: 10 to 75%]

Ferrite is a structure effective for improving ductility and is preferably contained in a volume fraction of 10 to 75% in a steel sheet structure. A volume fraction of ferrite of less than 10% may result in insufficient ductility. Ferrite is more preferably contained in the steel sheet structure in a volume fraction of 15% or more, further preferably 20% or more, from the viewpoint of ductility. On the other hand, since ferrite is a soft structure, a volume fraction of ferrite of more than 75% may result in insufficient strength. The volume fraction of ferrite contained in the steel sheet structure is preferably 65% or less, further preferably 50% or less, for enhancing the tensile strength of the steel sheet.

[Bainitic Ferrite and/or Bainite: 10 to 50%]

Bainitic ferrite and/or bainite are structures excellent in balance between strength and ductility and are preferably contained in a volume fraction of 10 to 50% in a steel sheet structure. Further, bainitic ferrite and/or bainite are microstructures having strength between those of soft ferrite and hard martensite and between those of tempered martensite and retained austenite and are more preferably contained in 15% or more, further preferably contained in 20% or more, from the viewpoint of bendability and stretch flanging properties. On the other hand, a volume fraction of bainitic ferrite and/or bainite of more than 50% is not preferred because of resulting in excessively increased yield stress and deteriorated shape fixability.

[Tempered Martensite: 10 to 50%]

Tempered martensite is a structure that greatly improves tensile strength and may be contained in a volume fraction of 50% or less in a steel sheet structure. The volume fraction of tempered martensite is preferably 10% or more from the viewpoint of tensile strength. On the other hand, a volume fraction of tempered martensite contained in the steel sheet structure, of more than 50%, is not preferred because of resulting in excessively increased yield stress and deteriorated shape fixability.

[Fresh Martensite: 15% or Less]

Fresh martensite greatly improves tensile strength but becomes a fracture origin to greatly deteriorate bendability, and the volume fraction thereof is therefore preferably limited to 15% or less in a steel sheet structure. The volume fraction of fresh martensite is more preferably 10% or less, further preferably 5% or less, for enhancing bendability and stretch flanging properties.

[Retained Austenite: 20% or Less]

Retained austenite greatly improves strength and ductility and may be therefore contained in an amount having an upper limit of 20% in a steel sheet. On the other hand, retained austenite becomes a fracture origin to greatly deteriorate stretch flanging properties, and the volume fraction thereof is therefore preferably 17% or less, more preferably 15% or less.

[Other Structures]

The steel sheet structure of the high-strength steel sheet as the base material in the present invention may contain structures other than the above, such as pearlite and/or coarse cementite. However, bendability is deteriorated when there is a large amount of pearlite and/or coarse cementite in the steel sheet structure of the high-strength steel sheet. Thus, the total volume fraction of pearlite and/or coarse cementite contained in the steel sheet structure is preferably 10% or less, more preferably 5% or less.

The volume fraction of each structure contained in the steel sheet structure of the high-strength steel sheet used as the base material in the present invention can be measured, e.g., by a method described below.

For the volume fraction of retained austenite, X-ray analysis is performed with a surface that is parallel to the sheet surface of the steel sheet and is at $1/4$ of the thickness thereof as an observation surface, to calculate an area fraction, which can be regarded as the volume fraction.

For the volume fraction of each of the structures, i.e., ferrite, bainitic ferrite, bainite, tempered martensite, and fresh martensite, a sample is collected with a cross section in the sheet thickness parallel to the direction of rolling the steel sheet as an observation surface, the observation surface is polished and nital-etched, and the range of $1/8$ to $3/8$ of a the thickness, assuming that $1/4$ of the thickness is a center, is observed with a field emission scanning electron microscope (FE-SEM) to measure an area fraction, which can be regarded as the volume fraction.

The method for producing a galvannealed layer and a plated steel sheet of the present invention will be explained below.

In the production method of the present invention, steps before obtaining the base steel sheet are not particularly limited, and thus, each step for forming the galvannealed layer on the base steel sheet having a predetermined sheet thickness is first explained. However, each step for forming the galvannealed layer can also be incorporated into an annealing step after cold rolling in a process for producing the base steel sheet, particularly a cooling process thereof, and the above points will be re-explained later with the explanation of the method of producing the base steel sheet.

In the method for producing a galvannealed layer and a plated steel sheet of the present invention, the process for forming the galvannealed layer on the surface of the base steel sheet basically includes a hot dip galvanizing step, an alloying treatment step, and an intra-plated-layer diffusion treatment step. In some cases, a phosphate coating formation treatment may also be performed after the intra-plated-layer diffusion treatment step. The conditions of the steps will be explained below.

[Hot Dip Galvanizing Step]

The hot dip galvanizing may be performed by continuously or discontinuously dipping the base steel sheet in a hot dip galvanizing bath in the same manner as a known technique. The temperature of the hot dip galvanizing bath in the performance is basically preferably not less than the melting point (about 420° C.) of Zn; however, since Zn may be locally solidified due to bath temperature fluctuation to make an operation unstable when the temperature is almost the melting point, the temperature is usually preferably 440° C. or more. On the other hand, since a bath temperature of more than 480° C. may result in generation of a Fe—Al—Zn phase which inhibits alloying, the temperature is usually preferably 480° C. or less. In addition, there is no particular problem even when Zn and a small amount of one or two or more of Al, Pb, Sb, Si, Sn, Mg, Mn, Ni, Cr, Co, Ca, Cu, Li, Ti, Be, Bi, Sr, I, Cs, and REM are contained or mixed in the hot dip galvanizing bath, and a preferable effect such as improvement of corrosion resistance or workability may be provided depending on the amount, as mentioned above.

In addition, the coating weight of plating metal in galvannealing is preferably 20 g/m$^2$ or more from the viewpoint of corrosion resistance and preferably 150 g/m$^2$ or less from the viewpoint of economical efficiency, and dipping time (sheet leaping rate), bath temperature, and the like may be appropriately adjusted so that such a coating weight is achieved.

[Alloying Treatment Step]

The alloying treatment step is a step for diffusing Fe from the base steel sheet into the hot dip galvanized layer formed on the surface of the base steel sheet in the preceding step and may include heating to a temperature in a range of 470 to 650° C. to maintain the temperature in the range or heating to a temperature in a range of 470 to 650° C. to perform annealing to the solidification temperature (about 420° C.) of Zn. When the heating temperature for the alloying treatment is less than 470° C., it becomes difficult to sufficiently diffuse Fe in the base steel sheet into the plated layer or long time is needed for diffusing a sufficient amount of Fe, to deteriorate productivity. On the other hand, when the heating temperature for the alloying treatment is more than 650° C., a problem that a coarse iron-based carbide is generated in the steel sheet occurs. Thus, the heating temperature for alloying treatment is specified in the range of 470 to 650° C. When the alloying treatment is performed by maintaining the temperature in the range of 470 to 650° C. by heating, time for the maintenance is desirably in a range of 10 to 120 seconds. Further, annealing time in the case of heating to the temperature in the range of 470 to 650° C. to perform annealing to the solidification temperature (about 420° C.) of Zn is preferably 15 to 200 seconds.

[Intra-Plated Layer Diffusion Treatment Step]

The hot dip galvanized layer subjected to the alloying treatment in the preceding step is subjected to diffusion treatment for diffusing Fe into the plated layer to reduce the concentration gradient of the amount of Fe in the plated layer, i.e., treatment for achieving the absolute value of a difference $\Delta Fe$ between the amount of Fe in the vicinity of the interface with the base steel sheet (the amount of Fe in the vicinity of an internal side) and the amount of Fe in the vicinity of the external surface of the plated layer (the amount of Fe in the vicinity of the external side) in the range of 0.0 to 3.0%. The intra-plated-layer diffusion treatment includes allowing the hot dip galvanized steel sheet subjected to the alloying treatment to stay at a temperature in a range of 250 to 450° C. and subjecting the hot dip galvanized steel sheet to one or more times of bending-unbending working in the temperature range. By bending-unbending working one or more times at the temperature in the range of 250 to 450° C. in such a manner, Fe can be easily diffused in the plated layer while suppressing diffusion of Fe from the base steel sheet into the plated layer, to thereby reduce the concentration gradient of Fe in the plated layer. The reason why Fe in the plated layer can be easily diffused while suppressing the diffusion of Fe from the base steel sheet in the bending-unbending working at the temperature in the above range can be considered as follows: a defect such as an atomic vacancy and/or a dislocation is introduced mainly into the plated layer by the bending-unbending working, to activate the diffusion of Fe atoms in the plated layer, while the diffusion of Fe atoms in the base steel sheet does not occur due to sufficiently low temperature, and therefore, the diffusion of Fe from the base steel sheet into the plated layer can only restrictively occur.

When the temperature in the intra-plated-layer diffusion treatment is less than 250° C., the diffusion of Fe in the plated layer does not sufficiently proceed; while, at the temperature of more than 450° C., melting of the plated layer may be started to rapidly diffuse Fe from the base steel sheet into the plated layer and to conversely increase the Fe concentration gradient, and hot dipping metal simultaneously adheres to a roll for bending-unbending working due to the melting of the plated layer, to make it practically impossible to perform the bending-unbending working. Thus, the temperature in the intra-plated-layer diffusion treatment is in the range of 250 to 450° C.

One bending working is preferably performed so that a maximum tensile strain amount on the surface of the steel sheet ranges from 0.0007 to 0.0910. A maximum tensile strain amount of less than 0.0007 results in an insufficient alloying acceleration effect. The maximum tensile strain amount is preferably 0.0010 or more for sufficiently accelerating alloying. On the other hand, a maximum tensile strain amount of more than 0.0910 results in impossible keeping of the shape of the steel sheet to deteriorate flatness. The maximum tensile strain amount is preferably 0.0500 or less, further preferably 0.0250 or less, for well keeping the shape of the steel sheet.

The sheet thickness of the steel sheet of the present invention is 0.6 mm to 10.0 mm. This is because the thickness of less than 0.6 mm results in impossible sufficient keeping of the flat shape of the sheet while the thickness of more than 10.0 mm results in difficult temperature control to make it impossible to obtain predetermined characteristics.

A roll diameter can be selected depending on the steel sheet so that a strain amount in bending working has an appropriate value and preferably ranges from 50 mm to 800 mm in consideration of a maintenance cost. The maximum tensile strain amount introduced into the surface of the steel sheet is a value obtained by dividing the thickness t of the sheet by the sum (D+t) of the roll diameter D and the thickness t of the sheet.

Such a galvannealed steel sheet of which the alloying treatment has been finished can be subjected as a product sheet without processing the sheet to coating or press working for an automotive outside sheet or the like and may be further subjected to phosphate coating treatment as described below.

[Phosphate Coating Formation Step]

The phosphate coating formation step is a step for forming a coating including a P oxide and/or a complex oxide containing P on the surface of the galvannealed layer subjected to the intra-plated-layer diffusion treatment. In other words, in some cases, an oxide layer containing P (phosphate coating) has been conventionally formed by treating the plated surface of the steel sheet with a treatment liquid including phosphoric acid or a P-containing oxide in order to enhance the press moldability and deep drawability of the galvannealed steel sheet, to thereby impart the die of the steel sheet with lubricity and adhesion prevention properties; and the galvannealed steel sheet of the present invention may also be subjected to treatment for forming such a coating, and the effects of the present invention are not deteriorated even in the case. The specific conditions of the phosphate coating treatment step are not particularly limited, but the step may be performed under the same conditions as conventional ones.

A desirable embodiment of the method for producing a high-strength steel sheet which becomes the base material for the galvannealed steel sheet of the present invention will be explained below. As mentioned above, hot dip galvanizing on the surface of the steel sheet, alloying treatment, and, in addition, intra-plated-layer diffusion treatment can be incorporated into a step for producing a base steel sheet, particularly into a cooling process in an annealing step after cold rolling, and the plating-related steps in the case will also be explained together. In addition, various conditions described in the explanation of the method for producing the base steel sheet below are described strictly as desirable conditions, and the method for producing the base steel sheet is not limited to the conditions.

For producing the high-strength steel sheet as the base steel sheet, first, a slab having the above-mentioned chemical components (composition) is cast and the slab is hot-rolled.

As the slab subjected to the hot rolling, a continuously cast slab or a slab produced by a thin slab caster or the like can be used. The method for producing the high-strength steel sheet of the present invention is adapted to a process such as continuous casting-direct rolling (CC-DR) in which hot rolling is performed immediately after casting.

In the hot rolling step, slab heating temperature is 1050° C. or more. When the slab heating temperature is excessively low, finishing rolling temperature is less than the $Ar_3$ transformation temperature to result in dual-phase rolling of ferrite and austenite, the structure of the hot-rolled sheet becomes a heterogeneous duplex grain structure, the heterogeneous structure does not disappear even through cold rolling and annealing steps, and ductility and bendability are poor. Since there is a concern that reduction in finishing rolling temperature results in excessive increase of a rolling load to preclude rolling or to result in the defect of the shape of the rolled steel sheet, the slab heating temperature is preferably 1050° C. or more. The effects of the present invention are exerted without particularly specifying the upper limit of the slab heating temperature; however, since the excessively high heating temperature is economically unfavorable, the upper limit of the slab heating temperature is desirably 1350° C. or less.

The above $Ar_3$ transformation temperature is calculated by the following expression:

$$Ar_3 = 901 - 325 \times C + 33 \times Si - 92 \times (Mn + Ni/2 + Cr/2 + Cu/2 + Mo/2) + 52 \times Al$$

In the above expression, each of C, Si, Mn, Ni, Cr, Cu, Mo, and Al represents the content [mass %] of each element.

The lower and upper limits of the finishing rolling temperature of the hot rolling are the higher one of 800° C. and the $Ar_3$ temperature and 1000° C., respectively. There is a concern that a finishing rolling temperature of less than 800° C. results in increase of a rolling load in finishing rolling to preclude hot rolling or to result in the defect of the shape of the hot-rolled sheet steel obtained after hot rolling. When finishing rolling temperature is less than the $Ar_3$ temperature, hot rolling may become dual-phase rolling of ferrite and the austenite and the structure of the hot-rolled steel sheet may become a heterogeneous duplex grain structure.

On the other hand, the effects of the present invention are exerted without particularly specifying the upper limit of the finishing rolling temperature; however, when the finishing rolling temperature is excessively high temperature, excessively high slab heating temperature is preferred for securing the temperature. Thus, the upper limit temperature of the finishing rolling temperature is desirably 1000° C. or less.

The finishing-rolled steel sheet (hot-rolled steel sheet) is usually immediately wound up in coil form. Since the winding up at a temperature of more than 800° C. results in the excessively increased thickness of an oxide formed on the surface of the steel sheet to deteriorate pickling properties, the winding temperature is 750° C. or less. The winding temperature is preferably 720° C. or less, further preferably 700° C. or less, for enhancing pickling properties. On the other hand, since the winding temperature of less than 500° C. results in the excessively increased strength of the hot-rolled steel sheet to preclude cold-rolling, the winding temperature is 500° C. or more. The winding temperature is preferably 550° C. or more, more preferably 600° C. or more, for reducing a cold-rolling load.

The hot-rolled steel sheet produced in such a manner is pickled. Pickling makes it possible to remove an oxide on the surface of the steel sheet and is therefore important for the hot dipping properties of the steel sheet as the base material for the galvannealed steel sheet. Further, the pickling may be performed once or several times.

Although the pickled steel sheet may be subjected to an annealing step without being processed, the steel sheet having high sheet thickness accuracy and an excellent shape is obtained by being subjected to cold rolling at a rolling reduction of 35 to 75%. Since the rolling reduction of less than 35% makes it difficult to keep the flat shape to deteriorate the ductility of a final product, the rolling reduction is 35% or more. On the other hand, cold rolling at a rolling reduction of more than 75% results in an excessively large cold-rolling load to preclude cold rolling. Thus, the upper limit of the rolling reduction is 75% or less.

In addition, the effects of the present invention are exerted without particularly limiting the number of times of roll passing and a rolling reduction at each passing.

Then, the obtained cold-rolled steel sheet is subjected to annealing treatment. Hot dip galvanizing treatment, alloying treatment, and, in addition, intra-plated-layer diffusion treatment of the surface of the steel sheet are desirably incorporated into a cooling process in the annealing step. Thus, the annealing treatment of the base steel sheet, into which the plating-related steps are incorporated, will be explained.

It is desirable to heat the steel sheet so that maximum heating temperature is in a range of 740 to 870° C. and to then cool the steel sheet so that an average cooling rate is 1.0 to 10.0° C./sec until 680° C. and an average cooling rate is 5.0 to 200.0° C./sec in a range of 500° C. to 680° C., in the annealing treatment. The maximum heating temperature of more than 870° C. results in significantly deteriorated plating properties. Preferably, the maximum heating temperature is 850° C. or less. Further, the maximum heating temperature of less than 740° C. causes a large amount of molten coarse iron-based carbide to remain to deteriorate bendability. Preferably, the maximum heating temperature is 760° C. or more. When a cooling rate condition after heating to the maximum heating temperature deviates from the above range, it may be impossible to obtain the steel sheet that satisfies the preferred microstructure conditions of such a base steel sheet as mentioned above.

After cooling so that the average cooling rate in the range of 500° C. to 680° C. is 5.0 to 200.0° C./sec as mentioned above, cooling is temporally performed to 350 to 450° C. and reheating is then performed or the steel sheet is dipped without being processed in a hot dip galvanizing tank to perform hot dip galvanizing treatment. The hot dipping treatment may be performed under the conditions described in the above-mentioned section [Hot Dip Galvanizing Step].

After the hot dip galvanizing treatment, cooling is performed to a temperature that is lower than the solidification temperature of Zn to solidify Zn adhering to the surface of the steel sheet, followed by performing alloying treatment of the hot dip galvanized layer. In other words, reheating is performed to 470 to 650° C., and annealing is performed to 420° C. for 15 to 200 seconds to promote alloying of the plated layer. Alternatively, alloying of the plated layer may also be promoted by performing reheating to a temperature in a range of 470 to 650° C. and maintaining a temperature in the range for 10 to 120 seconds. Conditions on the alloying treatment are the same as those described in the above-mentioned section [Alloying Treatment Step].

Subsequently, diffusion treatment for flattening the concentration gradient of Fe in the plated layer is performed. In other words, staying is performed for 60 to 1000 seconds at a temperature in a range of 250 to 420° C. in the cooling process after the alloying treatment or cooling to room temperature or around room temperature is temporally performed after the alloying treatment, reheating is then performed to a temperature in a range of 250 to 420° C., and staying is performed at a temperature in the range for 60 to 1000 seconds. In addition, repeated bending-unbending transformation is performed one or more times in the temperature range. For the repeated bending-unbending transformation in the diffusion treatment, it is desirable to use a roll having a radius in a range of 50 to 800 mm, e.g., a roll having a radius of 800 mm as mentioned above.

In the above-mentioned annealing step, surface modification and improvement of plating properties may be attempted by controlling an atmosphere in a furnace, disposing an oxidizing zone and a reducing zone, and causing an oxidation-reduction reaction of Fe and alloy elements in the surface layer of the steel sheet. Specifically, plating treatment can be performed while making Si inhibiting plating properties remain in the steel by forming an external oxidizing zone mainly including Fe in the oxidizing zone at a combustion air ratio of 0.9 or more and 1.2 or less, further making Si participate therein to fix Si in the steel, and then performing reduction in the reducing zone in an atmosphere in which the logarithm log (PH2O/PH2) of a water partial pressure and a hydrogen partial pressure is −3.0 or more and 0.0 or less, to reduce only an iron oxide in the surface layer.

After the annealing treatment also serving as each step for plating treatment, cooling may be performed to room temperature, followed by performing cold-rolling again at 0.05 to 3.00% for correcting a shape.

Furthermore, a coating including a P oxide and/or a complex oxide containing P can be formed by such phosphate coating formation treatment as mentioned above.

The present invention is specifically explained below with reference to examples. It will be appreciated that the examples described below are intended to describe the specific effects by the present invention and conditions described in the examples do not limit the technical scope of the present invention.

EXAMPLES

Slabs having the chemical components (compositions) of A to BD listed in Table 1 and Table 2 (note: the left-side end of Table 2 follows the right-side end of Table 1 in Table 1 and Table 2 indicating each chemical component) were cast and subjected to hot rolling, cooling, winding, and pickling under conditions listed in Table 3 to Table 5 immediately after the casting. Then, Experiment Examples 3, 9, 27, 32, 35, and 44 were not processed but the other Experiment Examples were cold-rolled at rolling reductions listed in Table 3 to Table 5, followed by annealing the examples under conditions listed in Table 6 to Table 8 to make steel sheets in Experiment Examples 1 to 83 and 101 to 116.

Sheet thicknesses after the cold-rolling are 1.0 mm in Experiment Examples 1 to 29 and 81 to 83, 2.4 mm in Experiment Examples 30 to 48, 0.8 mm in Experiment Examples 49 to 66, and 1.6 mm in Experiment Examples 67 to 80. Sheet thicknesses in Experiment Examples 101 to 116 are listed in Table 8.

Heating was performed to maximum heating temperatures listed in Table 6 to Table 8 in the annealing step after the cold-rolling, and, in the subsequent cooling process, cooling was performed at "cooling rates 1" in Table 6 to Table 8 from the maximum heating temperatures to 680° C., cooling was performed at "cooling rates 2" from 680° C. to 500° C., and cooling was further performed to "cooling stop temperatures". When the cooling stop temperature was less than 430° C., reheating was performed to 430° C. or more. Furthermore, dipping was performed in a galvanizing bath to perform hot dip galvanizing treatment, heating was then performed to alloying temperatures listed in Table 6 to Table 8 as an alloying treatment step, and annealing was performed to 420° C. for treatment times listed in Table 6 to Table 8.

Then, staying was performed at average temperatures listed in Table 6 to Table 8 in a range of 250 to 420° C. for times listed in Table 6 to Table 8 as an intra-plated-layer diffusion treatment step, during which bending-unbending working with rolls having radii listed in Table 6 to Table 8 was performed at strain amounts and the number of times of working listed in Table 6 to Table 8, followed by performing cooling to room temperature.

After the cooling to the room temperature, cold-rolling at 0.15% was performed on conditions 7 to 24, cold-rolling at 0.60% was performed on conditions 25 to 44, and cold-rolling at 0.25% was performed on conditions 45 to 83.

In addition, the condition 26 or 31 is an example in which a coating including a P-based complex oxide was applied to the surface of a plated layer and provides good characteristics.

The analysis results of the microstructures of the steel sheets in Experiment Examples 1 to 83 and 101 to 116 are listed in Table 9 to Table 11. In microstructure fractions, the amount of retained austenite (retained γ) was measured by X-ray diffraction on a plane at a ¼ thickness parallel to a sheet surface. The others, which were the results of measuring the fractions of microstructures in the range of a ⅛ thickness to a ⅜ thickness, were measured by cutting a sheet thickness cross section parallel to a rolling direction, nital-etching the cross section polished to be a mirror surface, and observing the cross section using a field emission scanning electron microscope (FE-SEM).

The evaluation results of the plated layers and characteristics of the steel sheets in Experiment Examples 1 to 83 and 101 to 116 are listed in Table 12 to Table 14. For Fe % of the plated layer, Fe % was measured in the range of (⅛×plated layer thickness) to (⅞×plated layer thickness) starting from a ferrite/plated layer interface using EDX, to determine the average amount of Fe, and the absolute value of a difference ΔFe between the amount of Fe at a position of (⅛×plated layer thickness) and the amount of Fe at a position of (⅞×plated layer thickness), i.e., the value of |ΔFe %| was determined. In addition, a relationship of the value of the average amount of Fe, the value of |ΔFe %|, and the appearance of the plated layer in each experiment example is indicated in FIG. 1.

Tensile test pieces according to JIS Z 2201 were collected from the steel sheets in Experiment Examples 1 to 83 and 101 to 116 and were subjected to a tensile test according to JIS Z 2241 to measure the yield strengths, tensile strengths, and total elongations thereof.

Further, a 90-degree V-bending test was conducted. Test pieces of 35 mm×100 mm were cut from the steel sheets in Experiment Examples 1 to 83 and 101 to 116, the shear cutting planes thereof were mechanically ground to make a bend radius twice a sheet thickness, and a test piece in which broking and/or necking did not occur at all was evaluated as accepted (O) while a test piece in which any thereof was observed was evaluated as rejected (x).

In addition, for the tensile strength TS, the case of TS≥900 MPa can be evaluated as accepted, and for the ductility, the case of TS×EL≥15000 MPa·% can be evaluated as accepted.

Furthermore, as a test for evaluating the appearance of a plated layer, unbending of a test piece was performed, an adhesion tape (cellophane tape) was stuck to the test piece and was removed, and the degree of peeling of plating adhering to the adhesion tape was visually observed. A test piece in which a plated layer was not peeled was evaluated as accepted (O), while a test piece in which plating was considerably peeled was evaluated as rejected (x).

In Experiment Examples 1 to 83 and 101 to 116, Experiment Examples 1 to 3, 5 to 9, 11 to 14, 19, 20, 23, 25 to 64, 67, 68, 73 to 80, 101 to 102, 104 to 105, 107 to 108, 110 to 111, and 113 to 116 are present invention examples. All the invention examples were confirmed not only to be excellent in mechanical performance but also to have good workability, particularly good bendability and to have the good peeling resistance of a plated layer.

On the other hand, in each experiment example corresponding to a comparative example, poor performance was exhibited as described below.

In other words, Experiment Example 16 is a comparative example in which the completion temperature of hot rolling was low and bendability was poor because a microstructure elongated in one direction and became heterogeneous.

Experiment Example 15 is a comparative example in which winding temperature was high after hot rolling, a pickling property was deteriorated, and the peeling resistance of a plated layer thus became poor.

Experiment Examples 4 and 69 are comparative examples in which annealing after cold-rolling was performed under the condition of high maximum heating temperature and the peeling resistance of each plated layer was poor.

Experiment Example 5 is a comparative example in which annealing after cold-rolling was performed under the condition of low maximum heating temperature, a coarse iron-based carbide was present, and the bendability of the steel sheet was poor since a large amount of the coarse iron-based carbide which became a fracture origin was contained. However, a plated layer was not peeled to provide a good appearance.

Experiment Example 11 is a comparative example in which a cooling rate 1 was low in a cooling process in annealing, a coarse iron-based carbide was generated, and the bendability of the steel sheet was poor. However, a plated layer was not peeled to provide a good appearance.

Experiment Example 12 is a comparative example in which a cooling rate 1 was high in a cooling process in annealing, a soft structure was not sufficiently generated, and the ductility and stretch flanging property of the steel sheet were poor. However, a plated layer was not peeled to provide a good appearance.

Experiment Example 6 is a comparative example in which a cooling rate 2 was low in a cooling process in annealing, a coarse iron-based carbide was generated, the stretch flanging property of the steel sheet was poor, and the bendability thereof was thus poor. However, a plated layer was not peeled to provide a good appearance.

Experiment Example 10 is a comparative example in which the temperature of alloying treatment of a hot dip galvanized layer was high, the plated layer was excessively alloyed, the amount of Fe in the plated layer was excessive, a coarse iron-based carbide was generated in the steel sheet, bendability was poor, and the peeling resistance of the plated layer was also poor.

Experiment Example 70 is a comparative example in which alloying treatment temperature was low, alloying of a plated layer did not proceed, and the peeling resistance of the plated layer was poor.

Experiment Example 17 is a comparative example in which alloying treatment time was short, alloying of a plated layer did not proceed, and the peeling resistance of the plated layer was poor.

Experiment Example 18 is a comparative example in which alloying treatment temperature was long, a plated layer became an excessive alloy, a coarse iron-based carbide was generated in the steel sheet, bendability was poor, and the peeling resistance of the plated layer was poor.

Experiment Examples 21 and 65 are comparative examples in which staying temperature was low in the intra-plated-layer diffusion treatment step, flattening of Fe % did not proceed in a plated layer, and the peeling resistance of the plated layer was poor.

Experiment Examples 22 and 72 are comparative examples in which staying time was short in the intra-plated-layer diffusion treatment step, flattening of Fe % did not proceed in a plated layer, and the peeling resistance of the plated layer was poor.

Experiment Example 23 is a comparative example in which staying time was too long in the intra-plated-layer diffusion treatment step, a coarse iron-based carbide was generated in the steel sheet, and the bendability of the steel sheet was poor. However, a plated layer was not peeled to provide a good appearance.

Experiment Examples 24, 66, and 71 are comparative examples in which the number of times of working was insufficient in the intra-plated-layer diffusion treatment step, flattening of Fe % in a plated layer did not proceed, and the peeling resistance of the plated layer was poor.

Experiment Examples 81 to 83 are examples in which chemical components deviated from the predetermined ranges and any sufficient characteristics were not obtained in all the examples.

Experiment Examples 103 and 112 are comparative examples in which the strain amount of working in the intra-plated-layer diffusion treatment step was large, the shape of the steel sheet was not flat, it was impossible to conduct a tensile test, a bending test and an unbending test, and the examples were inadequate as products.

Experiment Examples 106 and 109 are comparative examples in which the strain amount of working in the intra-plated-layer diffusion treatment step was small, flattening of Fe % in a plated layer did not proceed, and the peeling resistance of the plated layer was poor.

Accordingly, it is clear from the above experimental results that the present invention is effective for improving the adhesiveness of the galvannealed layer with the base steel sheet.

TABLE 1

| Experiment Example | C mass % | Si mass % | Mn mass % | P mass % | S mass % | Al mass % | N mass % | O mass % |
|---|---|---|---|---|---|---|---|---|
| A | 0.87 | 0.68 | 1.14 | 0.005 | 0.0023 | 0.036 | 0.0029 | 0.0019 |
| B | 0.146 | 1.54 | 2.13 | 0.017 | 0.0027 | 0.078 | 0.0052 | 0.0006 |
| C | 0.175 | 1.79 | 2.47 | 0.004 | 0.0063 | 0.045 | 0.0036 | 0.0016 |
| D | 0.088 | 1.19 | 1.40 | 0.005 | 0.0032 | 0.136 | 0.0040 | 0.0013 |
| E | 0.150 | 0.23 | 2.22 | 0.013 | 0.0023 | 0.066 | 0.0035 | 0.0009 |
| F | 0.091 | 0.25 | 1.87 | 0.007 | 0.0033 | 1.324 | 0.0050 | 0.0028 |
| G | 0.147 | 1.40 | 3.10 | 0.011 | 0.0063 | 0.063 | 0.0030 | 0.0019 |
| H | 0.233 | 0.46 | 1.37 | 0.011 | 0.0018 | 0.010 | 0.0059 | 0.0025 |
| I | 0.189 | 0.39 | 1.97 | 0.012 | 0.0002 | 0.023 | 0.0017 | 0.0035 |
| J | 0.224 | 1.74 | 2.79 | 0.014 | 0.0015 | 0.056 | 0.0026 | 0.0011 |
| K | 0.189 | 0.58 | 1.84 | 0.018 | 0.0037 | 0.215 | 0.0053 | 0.0029 |
| L | 0.091 | 1.08 | 2.31 | 0.011 | 0.0041 | 0.040 | 0.0029 | 0.0025 |
| M | 0.183 | 0.44 | 1.82 | 0.017 | 0.0004 | 0.024 | 0.0010 | 0.0012 |
| N | 0.170 | 2.11 | 0.80 | 0.008 | 0.0035 | 0.077 | 0.0030 | 0.0009 |
| O | 0.115 | 0.18 | 1.10 | 0.003 | 0.0053 | 0.071 | 0.0057 | 0.0010 |
| P | 0.152 | 1.00 | 2.37 | 0.010 | 0.0014 | 0.192 | 0.0017 | 0.0009 |
| Q | 0.128 | 1.29 | 2.77 | 0.010 | 0.0040 | 0.035 | 0.0037 | 0.0016 |
| R | 0.207 | 0.92 | 1.52 | 0.014 | 0.0077 | 0.080 | 0.0050 | 0.0018 |
| S | 0.263 | 1.20 | 2.07 | 0.022 | 0.0031 | 0.051 | 0.0034 | 0.0004 |
| T | 0.234 | 0.45 | 1.87 | 0.017 | 0.0059 | 1.005 | 0.0048 | 0.0012 |
| U | 0.140 | 2.26 | 1.00 | 0.015 | 0.0047 | 0.046 | 0.0025 | 0.0014 |
| V | 0.116 | 0.65 | 1.29 | 0.006 | 0.0031 | 0.042 | 0.0018 | 0.0023 |
| W | 0.206 | 0.89 | 1.35 | 0.013 | 0.0024 | 0.016 | 0.0013 | 0.0018 |
| X | 0.168 | 1.34 | 0.81 | 0.012 | 0.0064 | 0.062 | 0.0051 | 0.0014 |
| Y | 0.220 | 1.94 | 0.92 | 0.020 | 0.0057 | 0.031 | 0.0054 | 0.0016 |
| Z | 0.144 | 0.29 | 1.98 | 0.018 | 0.0018 | 0.524 | 0.0021 | 0.0027 |
| AA | 0.058 | 1.52 | 2.62 | 0.007 | 0.0016 | 0.031 | 0.0023 | 0.0007 |
| AB | 0.008 | 1.03 | 1.99 | 0.007 | 0.0016 | 0.030 | 0.0025 | 0.0008 |
| AC | 0.095 | 2.80 | 2.97 | 0.009 | 0.0031 | 0.031 | 0.0027 | 0.0010 |
| AD | 0.099 | 0.97 | 1.96 | 0.009 | 0.0033 | 2.033 | 0.0035 | 0.0005 |
| BA | 0.238 | 0.98 | 2.13 | 0.010 | 0.0047 | 0.052 | 0.0035 | 0.0006 |
| BB | 0.071 | 1.35 | 2.64 | 0.007 | 0.0004 | 0.116 | 0.0023 | 0.0007 |
| BC | 0.154 | 0.30 | 1.83 | 0.013 | 0.0025 | 1.182 | 0.0086 | 0.0011 |
| BD | 0.152 | 0.92 | 3.07 | 0.009 | 0.0031 | 0.015 | 0.0073 | 0.0009 |

TABLE 2

| Experiment Example | Ti mass % | Nb mass % | B mass % | Cr mass % | Ni mass % | Cu mass % | Mo mass % | V mass % | Ca mass % | Ce mass % | Mg mass % | Zr mass % | Hf mass % | REM mass % | Fe mass % | |
|---|---|---|---|---|---|---|---|---|---|---|---|---|---|---|---|---|
| A | — | — | — | — | — | — | — | — | — | — | — | — | — | — | Balance | Present Invention Example |
| B | — | — | — | — | — | — | — | — | — | — | — | — | — | — | Balance | Present Invention Example |
| C | — | — | — | — | — | — | — | — | — | — | — | — | — | — | Balance | Present Invention Example |
| D | — | — | — | — | — | — | — | — | — | — | — | — | — | — | Balance | Present Invention Example |
| E | 0.055 | — | — | — | — | — | — | — | — | — | — | — | — | — | Balance | Present Invention Example |
| F | — | 0.041 | — | — | — | — | 0.10 | — | — | — | — | — | — | — | Balance | Present Invention Example |
| G | — | — | 0.0022 | — | — | — | — | — | — | — | — | — | — | — | Balance | Present Invention Example |

TABLE 2-continued

| Experiment Example | Ti mass % | Nb mass % | B mass % | Cr mass % | Ni mass % | Cu mass % | Mo mass % | V mass % | Ca mass % | Ce mass % | Mg mass % | Zr mass % | Hf mass % | REM mass % | Fe mass % | |
|---|---|---|---|---|---|---|---|---|---|---|---|---|---|---|---|---|
| H | — | — | — | 1.00 | — | — | — | — | — | — | — | — | — | — | Balance | Present Invention Example |
| I | — | 0.015 | — | — | — | — | — | — | — | — | — | — | — | — | Balance | Present Invention Example |
| J | — | — | — | — | — | — | — | — | 0.0029 | — | — | — | — | — | Balance | Present Invention Example |
| K | — | — | — | — | 0.98 | — | — | — | — | — | — | — | — | — | Balance | Present Invention Example |
| L | — | — | — | — | — | — | — | — | — | 0.0017 | — | — | — | — | Balance | Present Invention Example |
| M | — | — | — | — | — | 0.45 | — | — | — | — | — | — | — | — | Balance | Present Invention Example |
| N | — | — | — | — | — | — | 0.22 | — | — | — | — | — | — | — | Balance | Present Invention Example |
| O | 0.021 | — | 0.0005 | — | — | — | 0.07 | — | — | — | — | — | — | — | Balance | Present Invention Example |
| P | — | — | — | — | — | — | — | — | — | — | 0.0012 | — | — | — | Balance | Present Invention Example |
| Q | — | — | — | — | — | — | — | — | — | — | — | 0.0015 | — | — | Balance | Present Invention Example |
| R | — | — | — | — | — | — | — | — | — | — | — | — | 0.0009 | — | Balance | Present Invention Example |
| S | — | — | — | — | — | — | — | — | — | — | — | — | — | 0.0022 | Balance | Present Invention Example |
| T | 0.009 | 0.055 | — | — | — | — | — | — | 0.0017 | — | — | — | — | — | Balance | Present Invention Example |
| U | 0.003 | 0.008 | 0.0022 | 0.22 | 0.39 | 0.21 | 0.18 | — | — | 0.0019 | — | — | — | — | Balance | Present Invention Example |
| V | — | — | — | — | — | — | — | 0.107 | — | — | — | — | — | — | Balance | Present Invention Example |
| W | — | — | — | — | — | — | — | — | — | — | — | — | — | — | Balance | Present Invention Example |
| X | — | — | 0.0045 | 0.47 | 0.15 | — | — | — | 0.0015 | 0.0033 | — | — | — | — | Balance | Present Invention Example |
| Y | 0.040 | — | — | 0.57 | — | — | 0.42 | — | 0.0009 | — | — | — | — | 0.0010 | Balance | Present Invention Example |
| Z | — | — | — | — | — | — | — | — | — | — | — | — | — | — | Balance | Present Invention Example |
| AA | — | — | — | — | 0.60 | 0.65 | — | — | — | — | — | — | — | — | Balance | Present Invention Example |
| AB | — | — | — | — | — | — | — | — | — | — | — | — | — | — | Balance | Comparative Example |
| AC | — | — | — | — | — | — | — | — | — | — | — | — | — | — | Balance | Comparative Example |
| AD | — | — | — | — | — | — | — | — | — | — | — | — | — | — | Balance | Comparative Example |
| BA | — | — | — | — | — | — | — | — | — | — | — | — | — | — | Balance | Present Invention Example |
| BB | — | — | — | — | — | — | — | — | — | — | — | — | — | — | Balance | Present Invention Example |
| BC | — | — | — | — | — | — | — | — | — | — | — | — | — | — | Balance | Present Invention Example |

TABLE 2-continued

| Experiment Example | Ti mass % | Nb mass % | B mass % | Cr mass % | Ni mass % | Cu mass % | Mo mass % | V mass % | Ca mass % | Ce mass % | Mg mass % | Zr mass % | Hf mass % | REM mass % | Fe mass % | |
|---|---|---|---|---|---|---|---|---|---|---|---|---|---|---|---|---|
| BD | — | — | — | — | — | — | — | — | — | — | — | — | — | — | Balance | Present Invention Example |

TABLE 3

| Experiment Example | Chemical Component | Slab Heating Temperature °C. | Ar₃ Transformation Temperature °C. | Hot Rolling Completion Temperature °C. | Winding Temperature °C. | Cold Rolling Reduction % | |
|---|---|---|---|---|---|---|---|
| 1 | A | 1230 | 792 | 950 | 644 | 50 | Present Invention Example |
| 2 | A | 1190 | 792 | 957 | 607 | 50 | Present Invention Example |
| 3 | A | 1185 | 792 | 961 | 665 | 0 | Present Invention Example |
| 4 | A | 1175 | 792 | 910 | 569 | 50 | Comparative Example |
| 5 | A | 1170 | 792 | 888 | 654 | 50 | Comparative Example |
| 6 | A | 1255 | 792 | 950 | 683 | 50 | Comparative Example |
| 7 | B | 1190 | 712 | 907 | 670 | 67 | Present Invention Example |
| 8 | B | 1255 | 712 | 926 | 649 | 47 | Present Invention Example |
| 9 | B | 1190 | 712 | 947 | 680 | 0 | Present Invention Example |
| 10 | B | 1215 | 712 | 895 | 584 | 47 | Comparative Example |
| 11 | B | 1215 | 712 | 928 | 681 | 47 | Comparative Example |
| 12 | B | 1230 | 712 | 920 | 627 | 47 | Comparative Example |
| 13 | C | 1245 | 678 | 922 | 566 | 54 | Present Invention Example |
| 14 | C | 1190 | 678 | 923 | 660 | 71 | Present Invention Example |
| 15 | C | 1210 | 678 | 961 | 815 | 54 | Comparative Example |
| 16 | C | 1255 | 678 | 790 | 590 | 54 | Comparative Example |
| 17 | C | 1260 | 678 | 948 | 597 | 54 | Comparative Example |
| 18 | C | 1205 | 678 | 954 | 653 | 54 | Comparative Example |
| 19 | D | 1270 | 790 | 930 | 580 | 67 | Present Invention Example |
| 20 | D | 1225 | 790 | 922 | 593 | 44 | Present Invention Example |
| 21 | D | 1240 | 790 | 889 | 629 | 44 | Comparative Example |
| 22 | D | 1230 | 790 | 925 | 648 | 44 | Comparative Example |
| 23 | D | 1265 | 790 | 934 | 569 | 44 | Comparative Example |
| 24 | D | 1230 | 790 | 893 | 560 | 44 | Comparative Example |
| 25 | E | 1195 | 659 | 932 | 683 | 50 | Present Invention Example |
| 26 | E | 1180 | 659 | 894 | 604 | 50 | Present Invention Example |
| 27 | E | 1215 | 659 | 895 | 589 | 0 | Present Invention Example |
| 28 | F | 1240 | 772 | 943 | 568 | 38 | Present Invention Example |
| 29 | F | 1195 | 772 | 918 | 598 | 54 | Present Invention Example |
| 30 | G | 1230 | 618 | 886 | 626 | 60 | Present Invention Example |

TABLE 4

| Experiment Example | Chemical Component | Slab Heating Temperature ° C. | Ar₃ Transformation Temperature ° C. | Hot Rolling Completion Temperature ° C. | Winding Temperature ° C. | Cold Rolling Reduction % | |
|---|---|---|---|---|---|---|---|
| 31 | G | 1260 | 618 | 911 | 715 | 60 | Present Invention Example |
| 32 | G | 1175 | 618 | 897 | 683 | 0 | Present Invention Example |
| 33 | H | 1250 | 669 | 954 | 602 | 50 | Present Invention Example |
| 34 | H | 1235 | 669 | 891 | 684 | 50 | Present Invention Example |
| 35 | H | 1170 | 669 | 904 | 610 | 0 | Present Invention Example |
| 36 | I | 1230 | 672 | 892 | 614 | 44 | Present Invention Example |
| 37 | I | 1210 | 672 | 919 | 681 | 44 | Present Invention Example |
| 38 | J | 1260 | 632 | 955 | 616 | 44 | Present Invention Example |
| 39 | J | 1255 | 632 | 910 | 622 | 44 | Present Invention Example |
| 40 | K | 1205 | 656 | 959 | 729 | 67 | Present Invention Example |
| 41 | K | 1210 | 656 | 949 | 608 | 67 | Present Invention Example |
| 42 | L | 1195 | 697 | 928 | 525 | 47 | Present Invention Example |
| 43 | L | 1210 | 697 | 962 | 563 | 47 | Present Invention Example |
| 44 | L | 1185 | 697 | 919 | 597 | 0 | Present Invention Example |
| 45 | M | 1205 | 669 | 917 | 638 | 38 | Present Invention Example |
| 46 | M | 1225 | 669 | 901 | 571 | 50 | Present Invention Example |
| 47 | N | 1195 | 836 | 913 | 655 | 47 | Present Invention Example |
| 48 | N | 1205 | 836 | 892 | 602 | 47 | Present Invention Example |
| 49 | O | 1215 | 769 | 931 | 601 | 60 | Present Invention Example |
| 50 | O | 1265 | 769 | 954 | 600 | 71 | Present Invention Example |
| 51 | P | 1255 | 677 | 896 | 654 | 50 | Present Invention Example |
| 52 | P | 1170 | 677 | 891 | 666 | 50 | Present Invention Example |
| 53 | Q | 1245 | 649 | 926 | 643 | 54 | Present Invention Example |
| 54 | Q | 1270 | 649 | 938 | 587 | 54 | Present Invention Example |
| 55 | R | 1180 | 728 | 904 | 566 | 54 | Present Invention Example |
| 56 | R | 1225 | 728 | 910 | 624 | 60 | Present Invention Example |
| 57 | S | 1215 | 667 | 898 | 661 | 60 | Present Invention Example |
| 58 | S | 1230 | 667 | 952 | 560 | 60 | Present Invention Example |
| 59 | T | 1260 | 720 | 930 | 657 | 60 | Present Invention Example |
| 60 | T | 1235 | 720 | 906 | 677 | 60 | Present Invention Example |

TABLE 5

| Experiment Example | Chemical Component | Slab Heating Temperature ° C. | Ar₃ Transformation Temperature ° C. | Hot Rolling Completion Temperature ° C. | Winding Temperature ° C. | Cold Rolling Reduction % | |
|---|---|---|---|---|---|---|---|
| 61 | U | 1220 | 794 | 890 | 705 | 60 | Present Invention Example |

TABLE 5-continued

| Experiment Example | Chemical Component | Slab Heating Temperature °C. | Ar₃ Transformation Temperature °C. | Hot Rolling Completion Temperature °C. | Winding Temperature °C. | Cold Rolling Reduction % | |
|---|---|---|---|---|---|---|---|
| 62 | U | 1260 | 794 | 945 | 629 | 54 | Present Invention Example |
| 63 | V | 1235 | 768 | 945 | 686 | 50 | Present Invention Example |
| 64 | V | 1175 | 768 | 949 | 602 | 50 | Present Invention Example |
| 65 | V | 1200 | 768 | 903 | 620 | 50 | Comparative Example |
| 66 | V | 1220 | 768 | 937 | 672 | 50 | Comparative Example |
| 67 | W | 1175 | 740 | 910 | 600 | 50 | Present Invention Example |
| 68 | W | 1250 | 740 | 928 | 617 | 50 | Present Invention Example |
| 69 | W | 1170 | 740 | 947 | 609 | 50 | Comparative Example |
| 70 | W | 1260 | 740 | 956 | 646 | 50 | Comparative Example |
| 71 | W | 1225 | 740 | 899 | 661 | 50 | Comparative Example |
| 72 | W | 1200 | 740 | 903 | 599 | 50 | Comparative Example |
| 73 | X | 1175 | 791 | 893 | 648 | 43 | Present Invention Example |
| 74 | X | 1170 | 791 | 918 | 633 | 43 | Present Invention Example |
| 75 | Y | 1255 | 765 | 888 | 566 | 50 | Present Invention Example |
| 76 | Y | 1220 | 765 | 939 | 675 | 60 | Present Invention Example |
| 77 | Z | 1260 | 709 | 926 | 640 | 40 | Present Invention Example |
| 78 | Z | 1190 | 709 | 916 | 645 | 60 | Present Invention Example |
| 79 | AA | 1170 | 635 | 926 | 680 | 47 | Present Invention Example |
| 80 | AA | 1195 | 635 | 941 | 572 | 67 | Present Invention Example |
| 81 | AB | 1230 | 751 | 912 | 609 | 50 | Comparative Example |
| 82 | AC | 691 | 828 | 887 | 648 | 50 | Comparative Example |
| 83 | AD | 1185 | 916 | 910 | 628 | 50 | Comparative Example |
| 101 | BA | 1215 | 663 | 899 | 585 | 67 | Present Invention Example |
| 102 | BA | 1230 | 663 | 908 | 513 | 67 | Present Invention Example |
| 103 | BA | 1205 | 663 | 920 | 570 | 67 | Comparative Example |
| 104 | BB | 1210 | 686 | 911 | 563 | 67 | Present Invention Example |
| 105 | BB | 1210 | 686 | 895 | 527 | 67 | Present Invention Example |
| 106 | BB | 1215 | 686 | 900 | 600 | 67 | Comparative Example |
| 107 | BC | 1220 | 754 | 918 | 561 | 50 | Present Invention Example |
| 108 | BC | 1205 | 754 | 908 | 593 | 50 | Present Invention Example |
| 109 | BC | 1220 | 754 | 895 | 567 | 50 | Comparative Example |
| 110 | BD | 1215 | 600 | 868 | 600 | 50 | Present Invention Example |
| 111 | BD | 1205 | 600 | 904 | 558 | 50 | Present Invention Example |
| 112 | BD | 1225 | 600 | 897 | 556 | 50 | Comparative Example |
| 113 | BA | 1190 | 663 | 942 | 624 | 67 | Present Invention Example |
| 114 | BB | 1210 | 686 | 891 | 624 | 67 | Present Invention Example |
| 115 | BC | 1230 | 754 | 905 | 594 | 50 | Present Invention Example |

TABLE 5-continued

| Experiment Example | Chemical Component | Slab Heating Temperature ° C. | Ar$_3$ Transformation Temperature ° C. | Hot Rolling Completion Temperature ° C. | Winding Temperature ° C. | Cold Rolling Reduction % | |
|---|---|---|---|---|---|---|---|
| 116 | BD | 1190 | 600 | 926 | 634 | 50 | Present Invention Example |

TABLE 6

| | | Annealing Step | | | | | Alloying Treatment Step | | Intra-Plated Layer Diffusion Treatment Step | | Bending-Unbending Working | | | The Number of Working Times | |
|---|---|---|---|---|---|---|---|---|---|---|---|---|---|---|---|
| | | Maximum Heating Temperature °C. | Cooling Process | | | | | | Staying | | | | | | |
| | | | Cooling Rate 1 °C./sec | Cooling Rate 2 °C./sec | Cooling Stop Temperature °C. | | Alloying Temperature °C. | Treatment Time Sec | Average Temperature °C. | Time Sec | Sheet Thickness mm | Roll Diameter mm | Strain Amount [—] | | |
| Experiment Example | Chemical Component | | | | | | | | | | | | | | |
| 1 | A | 797 | 4.9 | 12 | 426 | | 499 | 42 | 327 | 82 | 1.0 | 550 | 0.0018 | 2 | Present Invention Example |
| 2 | A | 848 | 3.3 | 7 | 472 | | 499 | 37 | 379 | 98 | 1.0 | 550 | 0.0018 | 2 | Present Invention Example |
| 3 | A | 836 | 1.8 | 12 | 467 | | 502 | 77 | 338 | 100 | 1.0 | 550 | 0.0018 | 3 | Present Invention Example |
| 4 | A | 918 | 5.6 | 8 | 461 | | 515 | 58 | 381 | 111 | 1.0 | 550 | 0.0018 | 3 | Comparative Example |
| 5 | A | 702 | 6.7 | 7 | 470 | | 509 | 76 | 339 | 135 | 1.0 | 550 | 0.0018 | 3 | Comparative Example |
| 6 | A | 793 | 4.5 | 2 | 467 | | 509 | 25 | 399 | 100 | 1.0 | 550 | 0.0018 | 3 | Comparative Example |
| 7 | B | 798 | 3.8 | 8 | 455 | | 491 | 75 | 389 | 678 | 1.0 | 430 | 0.0023 | 8 | Present Invention Example |
| 8 | B | 787 | 5.8 | 7 | 428 | | 524 | 80 | 304 | 114 | 1.0 | 430 | 0.0023 | 3 | Present Invention Example |
| 9 | B | 795 | 2.4 | 9 | 460 | | 497 | 38 | 404 | 102 | 1.0 | 430 | 0.0023 | 3 | Present Invention Example |
| 10 | B | 788 | 5.3 | 7 | 473 | | 678 | 69 | 375 | 98 | 1.0 | 430 | 0.0023 | 3 | Comparative Example |
| 11 | B | 796 | 0.3 | 11 | 457 | | 510 | 25 | 381 | 136 | 1.0 | 430 | 0.0023 | 4 | Comparative Example |
| 12 | B | 834 | 19.0 | 12 | 469 | | 515 | 25 | 325 | 123 | 1.0 | 430 | 0.0023 | 4 | Comparative Example |
| 13 | C | 774 | 2.2 | 57 | 475 | | 530 | 69 | 322 | 435 | 1.0 | 550 | 0.0018 | 8 | Present Invention Example |
| 14 | C | 792 | 5.4 | 67 | 371 | | 537 | 117 | 362 | 118 | 1.0 | 550 | 0.0018 | 4 | Present Invention Example |
| 15 | C | 778 | 6.4 | 72 | 480 | | 500 | 63 | 409 | 107 | 1.0 | 550 | 0.0018 | 4 | Comparative Example |
| 16 | C | 777 | 4.3 | 68 | 463 | | 528 | 71 | 393 | 134 | 1.0 | 550 | 0.0018 | 4 | Comparative Example |
| 17 | C | 817 | 2.1 | 59 | 457 | | 506 | 2 | 339 | 125 | 1.0 | 550 | 0.0018 | 4 | Comparative Example |
| 18 | D | 821 | 3.0 | 57 | 473 | | 530 | 278 | 377 | 127 | 1.0 | 550 | 0.0018 | 4 | Comparative Example |
| 19 | D | 844 | 2.3 | 29 | 473 | | 510 | 34 | 372 | 128 | 1.0 | 550 | 0.0018 | 4 | Present Invention Example |
| 20 | D | 818 | 6.1 | 29 | 474 | | 531 | 17 | 328 | 129 | 1.0 | 550 | 0.0018 | 3 | Present Invention Example |
| 21 | D | 782 | 5.2 | 34 | 455 | | 529 | 52 | 161 | 84 | 1.0 | 550 | 0.0018 | 3 | Comparative Example |
| 22 | D | 772 | 2.9 | 39 | 479 | | 514 | 53 | 343 | 22 | 1.0 | 550 | 0.0018 | 1 | Comparative Example |
| 23 | D | 784 | 3.5 | 41 | 467 | | 514 | 29 | 361 | 1800 | 1.0 | 550 | 0.0018 | 8 | Comparative Example |
| 24 | D | 800 | 6.1 | 41 | 469 | | 520 | 41 | 376 | 103 | 1.0 | 550 | 0.0018 | 0 | Comparative Example |
| 25 | E | 785 | 8.2 | 37 | 473 | | 507 | 75 | 348 | 108 | 1.0 | 550 | 0.0018 | 3 | Present Invention Example |
| 26 | E | 815 | 5.3 | 8 | 385 | | 567 | 71 | 365 | 119 | 1.0 | 375 | 0.0027 | 3 | Present Invention Example |
| 27 | E | 848 | 2.0 | 9 | 462 | | 533 | 72 | 390 | 142 | 1.0 | 550 | 0.0018 | 4 | Present Invention Example |
| 28 | F | 791 | 5.6 | 7 | 458 | | 499 | 32 | 328 | 150 | 1.0 | 550 | 0.0018 | 4 | Present Invention Example |
| 29 | F | 841 | 5.9 | 17 | 463 | | 487 | 28 | 369 | 400 | 1.0 | 375 | 0.0027 | 6 | Present Invention Example |
| 30 | G | 849 | 1.8 | 25 | 463 | | 537 | 80 | 337 | 88 | 2.4 | 550 | 0.0043 | 3 | Present Invention Example |

TABLE 7

| Experiment Example | Chemical Component | Annealing Step | | | | | Alloying Treatment Step | | Intra-Plated Layer Diffusion Treatment Step | | | Bending-Unbending Working | | | |
|---|---|---|---|---|---|---|---|---|---|---|---|---|---|---|---|
| | | Maximum Heating Temperature °C | Cooling Process | | | | Alloying Temperature °C | Treatment Time Sec | Staying | | Sheet Thickness mm | Roll Diameter mm | Strain Amount [—] | The Number of Working Times | |
| | | | Cooling Rate 1 °C/sec | Cooling Rate 2 °C/sec | Cooling Stop Temperature °C | | | | Average Temperature °C | Time Sec | | | | | |
| 31 | G | 837 | 7.5 | 16 | 426 | | 491 | 27 | 355 | 111 | 2.4 | 550 | 0.0043 | 3 | Present Invention Example |
| 32 | G | 803 | 3.5 | 18 | 460 | | 528 | 72 | 410 | 391 | 2.4 | 375 | 0.0064 | 6 | Present Invention Example |
| 33 | H | 780 | 5.4 | 30 | 435 | | 535 | 48 | 388 | 94 | 2.4 | 375 | 0.0064 | 3 | Present Invention Example |
| 34 | H | 791 | 3.1 | 89 | 462 | | 575 | 44 | 409 | 142 | 2.4 | 550 | 0.0043 | 4 | Present Invention Example |
| 35 | H | 807 | 5.0 | 81 | 480 | | 498 | 141 | 338 | 405 | 2.4 | 550 | 0.0043 | 6 | Present Invention Example |
| 36 | I | 813 | 4.8 | 75 | 474 | | 518 | 61 | 407 | 242 | 2.4 | 550 | 0.0043 | 4 | Present Invention Example |
| 37 | I | 842 | 3.9 | 43 | 480 | | 525 | 49 | 359 | 109 | 2.4 | 550 | 0.0043 | 3 | Present Invention Example |
| 38 | J | 794 | 4.1 | 56 | 476 | | 472 | 51 | 291 | 87 | 2.4 | 375 | 0.0064 | 2 | Present Invention Example |
| 39 | J | 825 | 2.5 | 60 | 420 | | 507 | 29 | 360 | 292 | 2.4 | 550 | 0.0043 | 6 | Present Invention Example |
| 40 | K | 825 | 1.9 | 38 | 476 | | 499 | 39 | 353 | 136 | 2.4 | 620 | 0.0039 | 4 | Present Invention Example |
| 41 | K | 834 | 5.3 | 53 | 400 | | 521 | 40 | 333 | 146 | 2.4 | 550 | 0.0043 | 4 | Present Invention Example |
| 42 | L | 855 | 5.4 | 60 | 436 | | 539 | 29 | 406 | 131 | 2.4 | 550 | 0.0043 | 4 | Present Invention Example |
| 43 | L | 783 | 1.2 | 39 | 468 | | 603 | 68 | 353 | 91 | 2.4 | 550 | 0.0043 | 3 | Present Invention Example |
| 44 | L | 840 | 2.7 | 37 | 466 | | 518 | 77 | 373 | 190 | 2.4 | 550 | 0.0043 | 4 | Present Invention Example |
| 45 | M | 831 | 5.9 | 59 | 467 | | 482 | 92 | 409 | 150 | 2.4 | 620 | 0.0039 | 3 | Present Invention Example |
| 46 | M | 807 | 6.0 | 127 | 480 | | 493 | 82 | 345 | 90 | 2.4 | 620 | 0.0039 | 2 | Present Invention Example |
| 47 | N | 808 | 8.0 | 11 | 468 | | 478 | 55 | 291 | 130 | 2.4 | 620 | 0.0039 | 4 | Present Invention Example |
| 48 | N | 812 | 3.4 | 11 | 427 | | 506 | 65 | 330 | 137 | 2.4 | 620 | 0.0039 | 4 | Present Invention Example |
| 49 | O | 778 | 3.6 | 12 | 464 | | 536 | 63 | 308 | 148 | 0.8 | 620 | 0.0013 | 4 | Present Invention Example |
| 50 | O | 785 | 5.8 | 108 | 458 | | 481 | 124 | 334 | 140 | 0.8 | 620 | 0.0013 | 4 | Present Invention Example |
| 51 | P | 789 | 3.8 | 7 | 457 | | 529 | 68 | 325 | 213 | 0.8 | 430 | 0.0019 | 5 | Present Invention Example |
| 52 | P | 847 | 4.2 | 12 | 471 | | 490 | 31 | 342 | 130 | 0.8 | 430 | 0.0019 | 3 | Present Invention Example |
| 53 | Q | 772 | 4.1 | 6 | 462 | | 524 | 28 | 398 | 125 | 0.8 | 430 | 0.0019 | 3 | Present Invention Example |
| 54 | Q | 794 | 4.3 | 12 | 465 | | 490 | 37 | 279 | 107 | 0.8 | 430 | 0.0019 | 3 | Present Invention Example |
| 55 | R | 831 | 4.9 | 14 | 469 | | 565 | 46 | 358 | 204 | 0.8 | 430 | 0.0019 | 4 | Present Invention Example |
| 56 | R | 826 | 5.0 | 32 | 479 | | 531 | 61 | 392 | 393 | 0.8 | 430 | 0.0019 | 6 | Present Invention Example |
| 57 | S | 778 | 4.6 | 34 | 367 | | 532 | 34 | 385 | 96 | 0.8 | 550 | 0.0015 | 3 | Present Invention Example |
| 58 | S | 781 | 3.1 | 30 | 464 | | 504 | 83 | 405 | 107 | 0.8 | 550 | 0.0015 | 3 | Present Invention Example |
| 59 | T | 829 | 6.4 | 43 | 457 | | 573 | 78 | 408 | 356 | 0.8 | 550 | 0.0015 | 5 | Present Invention Example |
| 60 | T | 852 | 5.0 | 18 | 467 | | 499 | 32 | 347 | 138 | 0.8 | 550 | 0.0015 | 3 | Present Invention Example |

TABLE 8

| Experiment Example | Chemical Component | Annealing Step - Maximum Heating Temperature °C | Annealing Step - Cooling Process - Cooling Rate 1 °C/sec | Annealing Step - Cooling Process - Cooling Rate 2 °C/sec | Annealing Step - Cooling Process - Cooling Stop Temperature °C | Alloying Treatment Step - Alloying Temperature °C | Alloying Treatment Step - Treatment Time Sec | Intra-Plated Layer Diffusion Treatment Step - Staying - Average Temperature °C | Intra-Plated Layer Diffusion Treatment Step - Staying - Time Sec | Intra-Plated Layer Diffusion Treatment Step - Bending-Unbending Working - Sheet Thickness mm | Intra-Plated Layer Diffusion Treatment Step - Bending-Unbending Working - Roll Diameter mm | Intra-Plated Layer Diffusion Treatment Step - Bending-Unbending Working - Strain Amount [—] | The Number of Times of Working Times | |
|---|---|---|---|---|---|---|---|---|---|---|---|---|---|---|
| 61 | U | 829 | 6.4 | 21 | 463 | 539 | 67 | 320 | 84 | 0.8 | 550 | 0.0015 | 2 | Present Invention Example |
| 62 | U | 811 | 3.1 | 17 | 472 | 529 | 41 | 333 | 116 | 0.8 | 550 | 0.0015 | 3 | Present Invention Example |
| 63 | V | 799 | 6.4 | 24 | 417 | 491 | 66 | 407 | 84 | 0.8 | 430 | 0.0019 | 2 | Present Invention Example |
| 64 | V | 782 | 2.2 | 16 | 465 | 490 | 32 | 322 | 116 | 0.8 | 430 | 0.0019 | 3 | Present Invention Example |
| 65 | V | 830 | 2.1 | 24 | 471 | 485 | 71 | 203 | 149 | 0.8 | 430 | 0.0019 | 3 | Comparative Example |
| 66 | V | 828 | 4.8 | 22 | 474 | 497 | 33 | 324 | 132 | 0.8 | 430 | 0.0019 | 1 | Comparative Example |
| 67 | W | 787 | 6.5 | 54 | 397 | 482 | 45 | 323 | 433 | 1.6 | 430 | 0.0037 | 6 | Present Invention Example |
| 68 | W | 778 | 2.8 | 56 | 458 | 536 | 62 | 331 | 87 | 1.6 | 430 | 0.0037 | 2 | Present Invention Example |
| 69 | W | 929 | 3.0 | 49 | 472 | 516 | 34 | 321 | 141 | 1.6 | 430 | 0.0037 | 2 | Comparative Example |
| 70 | W | 849 | 5.9 | 53 | 458 | 451 | 67 | 331 | 116 | 1.6 | 430 | 0.0037 | 2 | Comparative Example |
| 71 | W | 789 | 3.1 | 53 | 464 | 515 | 28 | 351 | 115 | 1.6 | 430 | 0.0037 | 1 | Comparative Example |
| 72 | W | 846 | 2.9 | 56 | 479 | 509 | 65 | 399 | 37 | 1.6 | 430 | 0.0037 | 2 | Comparative Example |
| 73 | X | 823 | 5.9 | 8 | 479 | 521 | 33 | 392 | 95 | 1.6 | 550 | 0.0029 | 3 | Present Invention Example |
| 74 | X | 781 | 5.7 | 8 | 469 | 508 | 63 | 372 | 104 | 1.6 | 550 | 0.0029 | 3 | Present Invention Example |
| 75 | Y | 829 | 6.3 | 12 | 468 | 560 | 47 | 322 | 90 | 1.6 | 375 | 0.0042 | 3 | Present Invention Example |
| 76 | Y | 818 | 6.3 | 8 | 468 | 498 | 51 | 325 | 149 | 1.6 | 375 | 0.0042 | 4 | Present Invention Example |
| 77 | Z | 796 | 4.3 | 14 | 475 | 577 | 70 | 360 | 134 | 1.6 | 620 | 0.0026 | 2 | Present Invention Example |
| 78 | Z | 795 | 5.2 | 20 | 465 | 537 | 49 | 357 | 112 | 1.6 | 620 | 0.0026 | 3 | Present Invention Example |
| 79 | AA | 861 | 6.3 | 21 | 466 | 516 | 56 | 385 | 126 | 1.6 | 550 | 0.0029 | 3 | Present Invention Example |
| 80 | AA | 820 | 5.3 | 24 | 461 | 539 | 29 | 358 | 124 | 1.6 | 550 | 0.0029 | 3 | Present Invention Example |
| 81 | AB | 813 | 4.5 | 32 | 471 | 512 | 70 | 405 | 83 | 1.0 | 550 | 0.0018 | 3 | Comparative Example |
| 82 | AC | 834 | 4.8 | 35 | 459 | 505 | 41 | 328 | 139 | 1.0 | 550 | 0.0018 | 3 | Comparative Example |
| 83 | AD | 786 | 4.2 | 36 | 472 | 505 | 44 | 327 | 130 | 1.0 | 550 | 0.0018 | 3 | Comparative Example |
| 101 | BA | 816 | 3.8 | 71 | 498 | 527 | 16 | 281 | 72 | 1.4 | 450 | 0.0031 | 4 | Present Invention Example |
| 102 | BA | 827 | 4.5 | 74 | 413 | 594 | 30 | 279 | 64 | 3.5 | 80 | 0.0421 | 4 | Present Invention Example |
| 103 | BA | 805 | 2.0 | 53 | 472 | 518 | 22 | 306 | 80 | 5.0 | 15 | 0.25 | 4 | Comparative Example |
| 104 | BB | 839 | 3.3 | 72 | 460 | 534 | 13 | 275 | 66 | 2.7 | 150 | 0.0177 | 4 | Present Invention Example |
| 105 | BB | 816 | 1.5 | 18 | 448 | 504 | 45 | 291 | 91 | 1.8 | 450 | 0.0040 | 4 | Present Invention Example |
| 106 | BB | 823 | 2.9 | 25 | 459 | 508 | 27 | 297 | 85 | 2.0 | without working | 0.0000 | 0 | Comparative Example |
| 107 | BC | 828 | 1.2 | 41 | 474 | 518 | 16 | 354 | 72 | 1.0 | 250 | 0.0040 | 5 | Present Invention Example |
| 108 | BC | 833 | 7.1 | 45 | 369 | 473 | 30 | 274 | 83 | 1.0 | 225 | 0.0044 | 5 | Present Invention Example |
| 109 | BC | 856 | 5.0 | 48 | 415 | 511 | 36 | 290 | 98 | 0.8 | 2500 | 0.0003 | 3 | Comparative Example |
| 110 | BD | 797 | 3.7 | 10 | 427 | 564 | 29 | 281 | 69 | 1.0 | 370 | 0.0027 | 5 | Present Invention Example |
| 111 | BD | 812 | 2.7 | 22 | 441 | 581 | 14 | 269 | 66 | 2.9 | 80 | 0.0347 | 5 | Present Invention Example |

TABLE 8-continued

| | | Annealing Step | | | | | Alloying Treatment Step | | Intra-Plated Layer Diffusion Treatment Step | | | | | | |
|---|---|---|---|---|---|---|---|---|---|---|---|---|---|---|---|
| | | Maximum | Cooling Process | | | | | | Staying | | Bending-Unbending Working | | | | |
| Experiment Example | Chemical Component | Heating Temperature °C. | Cooling Rate 1 °C./sec | Cooling Rate 2 °C./sec | Cooling Stop Temperature °C. | Alloying Temperature °C. | Treatment Time Sec | Average Temperature °C. | Time Sec | Sheet Thickness mm | Roll Diameter mm | Strain Amount [—] | The Number of Times of Working Times | |
| 112 | BD | 811 | 3.2 | 15 | 429 | 528 | 25 | 297 | 95 | 2.4 | 15 | 0.14 | 5 | Comparative Example |
| 113 | BA | 819 | 2.3 | 36 | 434 | 552 | 33 | 280 | 86 | 0.8 | 1000 | 0.008 | 6 | Present Invention Example |
| 114 | BB | 819 | 2.4 | 35 | 435 | 506 | 25 | 277 | 73 | 1.0 | 45 | 0.217 | 2 | Present Invention Example |
| 115 | BC | 818 | 2.2 | 40 | 445 | 547 | 31 | 279 | 77 | 1.0 | 45 | 0.217 | 6 | Present Invention Example |
| 116 | BD | 821 | 2.6 | 41 | 444 | 503 | 19 | 278 | 89 | 0.8 | 800 | 0.0010 | 6 | Present Invention Example |

TABLE 9

| Experiment Example | Chemical Component | F % | B % | BF % | TM % | M % | Retained γ % | Others % | |
|---|---|---|---|---|---|---|---|---|---|
| 1 | A | 49 | 18 | 11 | 18 | 0 | 4 | 0 | Present Invention Example |
| 2 | A | 24 | 32 | 23 | 17 | 1 | 3 | 0 | Present Invention Example |
| 3 | A | 33 | 19 | 15 | 31 | 0 | 2 | 0 | Present Invention Example |
| 4 | A | 14 | 26 | 25 | 30 | 0 | 4 | 1 | Comparative Example |
| 5 | A | 87 | 0 | 0 | 0 | 0 | 0 | 13 | Comparative Example |
| 6 | A | 61 | 14 | 10 | 9 | 0 | 0 | 6 | Comparative Example |
| 7 | B | 49 | 10 | 20 | 15 | 0 | 6 | 0 | Present Invention Example |
| 8 | B | 55 | 5 | 14 | 20 | 0 | 5 | 1 | Present Invention Example |
| 9 | B | 47 | 0 | 30 | 12 | 0 | 11 | 0 | Present Invention Example |
| 10 | B | 64 | 4 | 10 | 12 | 1 | 3 | 6 | Comparative Example |
| 11 | B | 56 | 2 | 16 | 12 | 0 | 7 | 7 | Comparative Example |
| 12 | B | 3 | 21 | 27 | 42 | 1 | 6 | 0 | Comparative Example |
| 13 | C | 69 | 0 | 12 | 14 | 0 | 5 | 0 | Present Invention Example |
| 14 | C | 53 | 4 | 20 | 12 | 0 | 11 | 0 | Present Invention Example |
| 15 | C | 59 | 3 | 10 | 16 | 1 | 11 | 0 | Comparative Example |
| 16 | C | 63 | 5 | 12 | 13 | 0 | 7 | 0 | Comparative Example |
| 17 | C | 36 | 0 | 28 | 20 | 1 | 14 | 1 | Comparative Example |
| 18 | C | 23 | 7 | 35 | 19 | 3 | 6 | 7 | Comparative Example |
| 19 | D | 31 | 23 | 24 | 17 | 0 | 5 | 0 | Present Invention Example |
| 20 | D | 47 | 6 | 22 | 21 | 0 | 4 | 0 | Present Invention Example |
| 21 | D | 67 | 4 | 10 | 18 | 1 | 0 | 0 | Comparative Example |
| 22 | D | 72 | 3 | 9 | 15 | 0 | 0 | 1 | Comparative Example |
| 23 | D | 70 | 5 | 13 | 6 | 0 | 0 | 6 | Comparative Example |
| 24 | D | 62 | 5 | 15 | 13 | 1 | 4 | 0 | Comparative Example |
| 25 | E | 23 | 38 | 10 | 29 | 0 | 0 | 0 | Present Invention Example |
| 26 | E | 14 | 44 | 10 | 29 | 0 | 2 | 1 | Present Invention Example |
| 27 | E | 16 | 38 | 7 | 33 | 1 | 4 | 1 | Present Invention Example |
| 28 | F | 74 | 6 | 8 | 8 | 1 | 3 | 0 | Present Invention Example |
| 29 | F | 69 | 12 | 10 | 6 | 0 | 3 | 0 | Present Invention Example |
| 30 | G | 18 | 16 | 35 | 23 | 1 | 7 | 0 | Present Invention Example |

TABLE 10

| Experiment Example | Chemical Component | F % | B % | BF % | TM % | M % | Retained γ % | Others % | |
|---|---|---|---|---|---|---|---|---|---|
| 31 | G | 21 | 14 | 39 | 18 | 0 | 8 | 0 | Present Invention Example |
| 32 | G | 31 | 4 | 38 | 16 | 0 | 10 | 1 | Present Invention Example |
| 33 | H | 40 | 20 | 6 | 32 | 0 | 2 | 0 | Present Invention Example |
| 34 | H | 28 | 32 | 10 | 27 | 0 | 1 | 2 | Present Invention Example |
| 35 | H | 15 | 24 | 12 | 46 | 0 | 3 | 0 | Present Invention Example |
| 36 | I | 10 | 34 | 13 | 38 | 0 | 4 | 1 | Present Invention Example |
| 37 | I | 11 | 52 | 15 | 17 | 1 | 4 | 0 | Present Invention Example |
| 38 | J | 32 | 3 | 33 | 12 | 0 | 19 | 1 | Present Invention Example |
| 39 | J | 15 | 17 | 35 | 19 | 0 | 14 | 0 | Present Invention Example |
| 40 | K | 16 | 31 | 30 | 16 | 0 | 7 | 0 | Present Invention Example |
| 41 | K | 18 | 20 | 23 | 32 | 0 | 7 | 0 | Present Invention Example |
| 42 | L | 21 | 21 | 30 | 22 | 2 | 4 | 0 | Present Invention Example |
| 43 | L | 56 | 5 | 17 | 19 | 0 | 3 | 0 | Present Invention Example |
| 44 | L | 22 | 11 | 25 | 39 | 0 | 3 | 0 | Present Invention Example |
| 45 | M | 19 | 28 | 16 | 31 | 0 | 5 | 1 | Present Invention Example |
| 46 | M | 16 | 31 | 16 | 31 | 0 | 4 | 2 | Present Invention Example |
| 47 | N | 67 | 3 | 6 | 15 | 0 | 8 | 1 | Present Invention Example |
| 48 | N | 48 | 5 | 25 | 13 | 1 | 5 | 3 | Present Invention Example |
| 49 | O | 52 | 23 | 5 | 18 | 1 | 1 | 0 | Present Invention Example |
| 50 | O | 48 | 30 | 4 | 17 | 0 | 1 | 0 | Present Invention Example |
| 51 | P | 52 | 10 | 13 | 20 | 0 | 5 | 0 | Present Invention Example |
| 52 | P | 10 | 11 | 46 | 25 | 0 | 8 | 0 | Present Invention Example |
| 53 | Q | 56 | 6 | 16 | 13 | 2 | 7 | 0 | Present Invention Example |
| 54 | Q | 35 | 10 | 32 | 16 | 0 | 7 | 0 | Present Invention Example |
| 55 | R | 12 | 17 | 38 | 22 | 0 | 11 | 0 | Present Invention Example |
| 56 | R | 21 | 20 | 24 | 26 | 0 | 9 | 0 | Present Invention Example |
| 57 | S | 38 | 4 | 15 | 26 | 0 | 17 | 0 | Present Invention Example |
| 58 | S | 39 | 8 | 23 | 13 | 0 | 17 | 0 | Present Invention Example |
| 59 | T | 71 | 0 | 11 | 7 | 1 | 10 | 0 | Present Invention Example |
| 60 | T | 57 | 3 | 16 | 11 | 2 | 10 | 1 | Present Invention Example |

TABLE 11

| | | Microstructure Observation Results Volume Fraction | | | | | | | |
|---|---|---|---|---|---|---|---|---|---|
| Experiment Example | Chemical Component | F % | B % | BF % | TM % | M % | Retained γ % | Others % | |
| 61 | U | 51 | 0 | 25 | 12 | 1 | 10 | 1 | Present Invention Example |
| 62 | U | 59 | 1 | 15 | 14 | 0 | 10 | 1 | Present Invention Example |
| 63 | V | 42 | 19 | 12 | 22 | 2 | 3 | 0 | Present Invention Example |
| 64 | V | 59 | 16 | 9 | 13 | 0 | 3 | 0 | Present Invention Example |
| 65 | V | 16 | 33 | 23 | 28 | 0 | 1 | 0 | Comparative Example |
| 66 | V | 20 | 24 | 13 | 36 | 1 | 5 | 1 | Comparative Example |
| 67 | W | 38 | 20 | 23 | 15 | 0 | 4 | 0 | Present Invention Example |
| 68 | W | 51 | 7 | 15 | 22 | 1 | 4 | 0 | Present Invention Example |
| 69 | W | 13 | 13 | 30 | 38 | 0 | 5 | 1 | Comparative Example |
| 70 | W | 16 | 24 | 26 | 30 | 0 | 4 | 0 | Comparative Example |
| 71 | W | 45 | 15 | 15 | 21 | 0 | 3 | 1 | Comparative Example |
| 72 | W | 19 | 20 | 35 | 25 | 0 | 1 | 0 | Comparative Example |
| 73 | X | 40 | 6 | 25 | 21 | 2 | 6 | 0 | Present Invention Example |
| 74 | X | 71 | 4 | 12 | 6 | 0 | 6 | 1 | Present Invention Example |
| 75 | Y | 43 | 2 | 27 | 21 | 0 | 7 | 0 | Present Invention Example |
| 76 | Y | 47 | 7 | 15 | 23 | 0 | 6 | 2 | Present Invention Example |
| 77 | Z | 59 | 16 | 7 | 12 | 1 | 5 | 0 | Present Invention Example |
| 78 | Z | 68 | 10 | 6 | 10 | 1 | 5 | 0 | Present Invention Example |
| 79 | AA | 13 | 11 | 27 | 38 | 0 | 10 | 1 | Present Invention Example |
| 80 | AA | 40 | 14 | 19 | 18 | 0 | 8 | 1 | Present Invention Example |
| 81 | AB | 95 | 0 | 2 | 0 | 0 | 0 | 3 | Comparative Example |
| 82 | AC | 47 | 0 | 19 | 24 | 0 | 10 | 0 | Comparative Example |
| 83 | AD | 69 | 4 | 10 | 11 | 1 | 5 | 0 | Comparative Example |
| 101 | BA | 41 | 19 | 9 | 26 | 0 | 4 | 1 | Present Invention Example |
| 102 | BA | 34 | 19 | 25 | 12 | 0 | 8 | 2 | Present Invention Example |
| 103 | BA | 49 | 28 | 12 | 5 | 0 | 6 | 0 | Comparative Example |
| 104 | BB | 44 | 26 | 10 | 14 | 0 | 6 | 0 | Present Invention Example |
| 105 | BB | 72 | 13 | 11 | 0 | 0 | 4 | 0 | Present Invention Example |
| 106 | BB | 40 | 27 | 22 | 2 | 0 | 9 | 0 | Comparative Example |
| 107 | BC | 66 | 13 | 8 | 11 | 0 | 2 | 0 | Present Invention Example |
| 108 | BC | 24 | 17 | 14 | 39 | 2 | 3 | 1 | Present Invention Example |
| 109 | BC | 29 | 21 | 31 | 17 | 0 | 2 | 0 | Comparative Example |
| 110 | BD | 31 | 25 | 31 | 6 | 4 | 3 | 0 | Present Invention Example |
| 111 | BD | 46 | 13 | 15 | 16 | 0 | 8 | 2 | Present Invention Example |
| 112 | BD | 45 | 9 | 25 | 13 | 0 | 8 | 0 | Comparative Example |
| 113 | BA | 64 | 10 | 16 | 9 | 0 | 1 | 0 | Present Invention Example |
| 114 | BB | 59 | 13 | 17 | 0 | 2 | 7 | 2 | Present Invention Example |
| 115 | BC | 51 | 28 | 4 | 12 | 4 | 0 | 1 | Present Invention Example |
| 116 | BD | 63 | 5 | 20 | 5 | 3 | 4 | 0 | Present Invention Example |

TABLE 12

| | | Results of Analysis of Plated Layer Components | | | Tensile Test | | | | Bending Test Appearance | | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa · % | Bendability (Steel Sheet) | Evaluation (Plated Layer) | |
| 1 | A | 10.8 | 0.4 | 37 | 548 | 943 | 24 | 22632 | ○ | ○ | Present Invention Example |
| 2 | A | 9.6 | 0.4 | 37 | 763 | 1001 | 20 | 20020 | ○ | ○ | Present Invention Example |
| 3 | A | 10.9 | 0.9 | 39 | 734 | 999 | 21 | 20979 | ○ | ○ | Present Invention Example |
| 4 | A | 7.5 | 4.4 | 33 | 808 | 949 | 23 | 21827 | ○ | x | Comparative Example |
| 5 | A | 11.4 | 1.5 | 32 | 540 | 698 | 13 | 9074 | x | ○ | Present Invention Example |
| 6 | A | 9.4 | 0.8 | 38 | 542 | 908 | 17 | 15436 | x | ○ | Present Invention Example |
| 7 | B | 10.7 | 2.3 | 41 | 771 | 1250 | 15 | 18750 | ○ | ○ | Present Invention Example |
| 8 | B | 10.1 | 1.7 | 38 | 678 | 1148 | 19 | 21812 | ○ | ○ | Present Invention Example |

TABLE 12-continued

| | | Results of Analysis of Plated Layer Components | | | Tensile Test | | | | Bending Test Bendability (Steel Sheet) | Appearance Evaluation (Plated Layer) | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa · % | Bendability (Steel Sheet) | Evaluation (Plated Layer) | |
| 9 | B | 8.7 | 0.9 | 37 | 733 | 1219 | 19 | 23161 | ○ | ○ | Present Invention Example |
| 10 | B | 13.2 | 2.4 | 35 | 896 | 1150 | 12 | 13800 | x | x | Comparative Example |
| 11 | B | 10.1 | 0.7 | 32 | 683 | 1023 | 16 | 16368 | x | ○ | Present Invention Example |
| 12 | B | 10.4 | 1.3 | 39 | 1200 | 1331 | 10 | 13310 | x | ○ | Present Invention Example |
| 13 | C | 10.8 | 2.5 | 41 | 623 | 1240 | 16 | 19840 | ○ | ○ | Present Invention Example |
| 14 | C | 10.2 | 0.9 | 37 | 660 | 1198 | 18 | 21564 | ○ | ○ | Present Invention Example |
| 15 | C | 7.3 | 5.1 | 42 | 676 | 1289 | 17 | 21913 | ○ | x | Comparative Example |
| 16 | C | 10.3 | 0.4 | 34 | 607 | 1243 | 8 | 9944 | ○ | ○ | Comparative Example |
| 17 | C | 7.2 | 2.3 | 35 | 883 | 1345 | 16 | 21520 | ○ | x | Comparative Example |
| 18 | C | 13.6 | 3.7 | 34 | 956 | 1111 | 12 | 13332 | x | x | Comparative Example |
| 19 | D | 9.6 | 0.5 | 34 | 687 | 976 | 21 | 20496 | ○ | ○ | Present Invention Example |
| 20 | D | 9.9 | 0.9 | 37 | 573 | 966 | 22 | 21252 | ○ | ○ | Present Invention Example |
| 21 | D | 10.5 | 3.5 | 35 | 485 | 1091 | 14 | 15274 | ○ | ○ | Comparative Example |
| 22 | D | 9.2 | 3.2 | 35 | 588 | 1060 | 15 | 15900 | ○ | x | Comparative Example |
| 23 | D | 10.9 | 1.5 | 35 | 796 | 933 | 13 | 12129 | x | ○ | Present Invention Example |
| 24 | D | 9.4 | 3.9 | 33 | 423 | 927 | 23 | 21321 | ○ | x | Comparative Example |
| 25 | E | 10.0 | 0.5 | 34 | 903 | 1111 | 15 | 16665 | ○ | ○ | Present Invention Example |
| 26 | E | 11.8 | 1.4 | 35 | 946 | 1126 | 14 | 15764 | ○ | ○ | Present Invention Example |
| 27 | E | 10.3 | 0.3 | 41 | 945 | 1103 | 17 | 18751 | ○ | ○ | Present Invention Example |
| 28 | F | 9.9 | 1.1 | 40 | 442 | 979 | 22 | 21538 | ○ | ○ | Present Invention Example |
| 29 | F | 8.9 | 1.9 | 40 | 359 | 951 | 21 | 19971 | ○ | ○ | Present Invention Example |
| 30 | G | 9.3 | 1.3 | 35 | 889 | 1150 | 18 | 20700 | ○ | ○ | Present Invention Example |

TABLE 13

| | | Results of Analysis of Plated Layer Components | | | Tensile Test | | | | Bending Test Bendability (Steel Sheet) | Appearance Evaluation (Plated Layer) | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa·% | Bendability (Steel Sheet) | Evaluation (Plated Layer) | |
| 31 | G | 8.7 | 1.4 | 36 | 847 | 1149 | 20 | 22980 | ○ | ○ | Present Invention Example |

TABLE 13-continued

| Experiment Example | Chemical Component | Results of Analysis of Plated Layer Components | | | Tensile Test | | | | Bending Test Bendability (Steel Sheet) | Appearance Evaluation (Plated Layer) | |
|---|---|---|---|---|---|---|---|---|---|---|---|
| | | Average Fe % | \|ΔFe %\| % | Coating Amount g/m2 | YS MPa | TS MPa | EL % | TS × El MPa·% | | | |
| 32 | G | 9.6 | 1.9 | 40 | 867 | 1180 | 16 | 18880 | ○ | ○ | Present Invention Example |
| 33 | H | 9.4 | 0.6 | 35 | 1063 | 1455 | 12 | 17460 | ○ | ○ | Present Invention Example |
| 34 | H | 10.9 | 0.7 | 34 | 962 | 1258 | 14 | 17612 | ○ | ○ | Present Invention Example |
| 35 | H | 9.2 | 1.8 | 42 | 1125 | 1265 | 15 | 18975 | ○ | ○ | Present Invention Example |
| 36 | I | 10.8 | 1.0 | 35 | 1106 | 1275 | 13 | 16575 | ○ | ○ | Present Invention Example |
| 37 | I | 10.5 | 0.4 | 34 | 984 | 1223 | 15 | 18345 | ○ | ○ | Present Invention Example |
| 38 | J | 10.2 | 1.7 | 40 | 975 | 1465 | 14 | 20510 | ○ | ○ | Present Invention Example |
| 39 | J | 9.6 | 0.9 | 40 | 979 | 1252 | 19 | 23788 | ○ | ○ | Present Invention Example |
| 40 | K | 9.1 | 1.3 | 37 | 949 | 1257 | 16 | 20112 | ○ | ○ | Present Invention Example |
| 41 | K | 10.7 | 0.9 | 32 | 993 | 1172 | 15 | 17580 | ○ | ○ | Present Invention Example |
| 42 | L | 10.6 | 0.5 | 35 | 758 | 996 | 20 | 19920 | ○ | ○ | Present Invention Example |
| 43 | L | 10.7 | 1.3 | 35 | 542 | 1039 | 23 | 23897 | ○ | ○ | Present nvention Example |
| 44 | L | 11.0 | 1.6 | 39 | 836 | 996 | 20 | 19920 | ○ | ○ | Present Invention Example |
| 45 | M | 10.3 | 1.0 | 38 | 972 | 1204 | 16 | 19264 | ○ | ○ | Present Invention Example |
| 46 | M | 9.8 | 0.8 | 37 | 969 | 1160 | 17 | 19720 | ○ | ○ | Present Invention Example |
| 47 | N | 8.1 | 1.6 | 38 | 602 | 1267 | 17 | 21539 | ○ | ○ | Present Invention Example |
| 48 | N | 9.7 | 1.5 | 36 | 750 | 1202 | 18 | 21636 | ○ | ○ | Present Invention Example |
| 49 | O | 11.3 | 1.3 | 39 | 655 | 1073 | 16 | 17168 | ○ | ○ | Present Invention Example |
| 50 | O | 10.9 | 0.8 | 33 | 665 | 1135 | 14 | 15890 | ○ | ○ | Present Invention Example |
| 51 | P | 9.0 | 1.8 | 38 | 692 | 1113 | 16 | 17808 | ○ | ○ | Present Invention Example |
| 52 | P | 10.4 | 1.1 | 33 | 1000 | 1183 | 17 | 20111 | ○ | ○ | Present Invention Example |
| 53 | Q | 10.7 | 0.3 | 42 | 553 | 1093 | 19 | 20767 | ○ | ○ | Present Invention Example |
| 54 | Q | 9.4 | 1.6 | 33 | 830 | 1187 | 17 | 20179 | ○ | ○ | Present Invention Example |
| 55 | R | 9.9 | 1.7 | 41 | 1042 | 1330 | 16 | 21280 | ○ | ○ | Present Invention Example |

TABLE 13-continued

| | | Results of Analysis of Plated Layer Components | | | Tensile Test | | | | Bending Test | Appearance | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa·% | Bendability (Steel Sheet) | Evaluation (Plated Layer) | |
| 56 | R | 9.3 | 1.0 | 41 | 1101 | 1352 | 14 | 18928 | ○ | ○ | Present Invention Example |
| 57 | S | 10.4 | 0.7 | 41 | 1114 | 1527 | 16 | 24432 | ○ | ○ | Present Invention Example |
| 58 | S | 9.4 | 0.7 | 38 | 873 | 1322 | 15 | 19830 | ○ | ○ | Present Invention Example |
| 59 | T | 10.2 | 1.6 | 37 | 572 | 1362 | 14 | 19068 | ○ | ○ | Present Invention Example |

TABLE 14

| | | Results of Analysis of Plated Layer Components | | | Tensile Test | | | | Bending Test | Appearance | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa·% | Bendability (Steel Sheet) | Evaluation (Plated Layer) | |
| 60 | T | 10.5 | 0.9 | 36 | 651 | 1278 | 16 | 20448 | ○ | ○ | Present Invention Example |
| 61 | U | 9.8 | 0.5 | 34 | 664 | 1162 | 20 | 23240 | ○ | ○ | Present Invention Example |
| 62 | U | 10.1 | 1.2 | 42 | 608 | 1164 | 22 | 25608 | ○ | ○ | Present Invention Example |
| 63 | V | 11.1 | 1.0 | 41 | 677 | 1033 | 18 | 18594 | ○ | ○ | Present Invention Example |
| 64 | V | 10.1 | 0.9 | 36 | 566 | 1146 | 16 | 18336 | ○ | ○ | Present Invention Example |
| 65 | V | 9.7 | 3.6 | 36 | 944 | 1169 | 14 | 16366 | ○ | x | Comparative Example |
| 66 | V | 10.5 | 3.4 | 34 | 873 | 1011 | 17 | 17187 | ○ | x | Comparative Example |
| 67 | W | 10.0 | 2.5 | 42 | 874 | 1313 | 15 | 19695 | ○ | ○ | Present Invention Example |
| 68 | W | 10.1 | 1.1 | 35 | 825 | 1400 | 15 | 21000 | ○ | ○ | Present Invention Example |
| 69 | W | 6.8 | 5.2 | 41 | 1100 | 1220 | 18 | 21960 | ○ | x | Comparative Example |
| 70 | W | 7.5 | 1.7 | 33 | 1041 | 1243 | 16 | 19888 | ○ | x | Comparative Example |
| 71 | W | 9.2 | 4.7 | 38 | 830 | 1244 | 15 | 18660 | ○ | x | Comparative Example |
| 72 | W | 10.5 | 3.5 | 32 | 1133 | 1429 | 11 | 15719 | ○ | x | Comparative Example |
| 73 | X | 10.2 | 0.3 | 39 | 805 | 1264 | 17 | 21488 | ○ | ○ | Present Invention Example |
| 74 | X | 9.6 | 1.1 | 37 | 463 | 1216 | 17 | 20672 | ○ | ○ | Present Invention Example |
| 75 | Y | 9.3 | 1.1 | 36 | 862 | 1392 | 15 | 20880 | ○ | ○ | Present Invention Example |
| 76 | Y | 10.3 | 1.0 | 36 | 854 | 1361 | 17 | 23137 | ○ | ○ | Present Invention Example |
| 77 | Z | 11.8 | 1.0 | 33 | 578 | 1122 | 16 | 17952 | ○ | ○ | Present Invention Example |

TABLE 14-continued

| | | Results of Analysis of Plated Layer Components | | | Tensile Test | | | | Bending Test | Appearance | |
|---|---|---|---|---|---|---|---|---|---|---|---|
| Experiment Example | Chemical Component | Average Fe % % | \|ΔFe %\| % | Coating Amount g/m2 | YS MPa | TS MPa | EL % | TS × El MPa·% | Bendability (Steel Sheet) | Evaluation (Plated Layer) | |
| 78 | Z | 10.7 | 1.5 | 33 | 552 | 1177 | 14 | 16478 | ○ | ○ | Present Invention Example |
| 79 | AA | 8.9 | 0.5 | 36 | 780 | 902 | 24 | 21648 | ○ | ○ | Present Invention Example |
| 80 | AA | 10.4 | 0.4 | 39 | 636 | 937 | 21 | 19677 | ○ | ○ | Present Invention Example |
| 81 | AB | 11.1 | 0.2 | 39 | 339 | 465 | 39 | 18135 | ○ | ○ | Comparative Example |
| 82 | AC | 3.8 | 4.5 | 41 | 635 | 1001 | 25 | 25025 | ○ | x | Comparative Example |
| 83 | AD | 4.7 | 4.0 | 37 | 454 | 1076 | 20 | 21520 | ○ | x | Comparative Example |
| 101 | BA | 11.2 | 1.1 | 28 | 704 | 1036 | 19 | 19691 | ○ | ○ | Present Invention Example |
| 102 | BA | 10.7 | 1.6 | 45 | 645 | 969 | 20 | 19378 | ○ | ○ | Present Invention Example |
| 103 | BA | 11.6 | 1.9 | 47 | — | — | — | — | — | — | Comparative Example |
| 104 | BB | 9.8 | 2.7 | 61 | 695 | 1102 | 20 | 22043 | ○ | ○ | Present Invention Example |
| 105 | BB | 11.8 | 1.2 | 34 | 532 | 1048 | 21 | 21999 | ○ | ○ | Present Invention Example |
| 106 | BB | 9.8 | 3.8 | 37 | 575 | 921 | 22 | 20257 | ○ | x | Comparative Example |
| 107 | BC | 8.6 | 0.9 | 25 | 895 | 1427 | 15 | 21404 | ○ | ○ | Present Invention Example |
| 108 | BC | 10.9 | 1.0 | 31 | 900 | 1174 | 15 | 17613 | ○ | ○ | Present Invention Example |
| 109 | BC | 9.7 | 4.0 | 30 | 1045 | 1430 | 13 | 18594 | ○ | x | Comparative Example |
| 110 | BD | 11.8 | 1.6 | 46 | 876 | 1254 | 14 | 17553 | ○ | ○ | Present Invention Example |
| 111 | BD | 10.4 | 2.5 | 59 | 554 | 908 | 20 | 18157 | ○ | ○ | Present Invention Example |
| 112 | BD | 11.5 | 1.4 | 44 | — | — | — | — | — | — | Comparative Example |
| 113 | BA | 11.4 | 2.8 | 41 | 503 | 1017 | 19 | 19323 | ○ | ○ | Present Invention Example |
| 114 | BB | 8.5 | 0.7 | 39 | 583 | 1078 | 24 | 25872 | ○ | ○ | Present Invention Example |
| 115 | BC | 11.6 | 1.3 | 38 | 637 | 917 | 20 | 18340 | ○ | ○ | Present Invention Example |
| 116 | BD | 8.6 | 2.4 | 42 | 605 | 965 | 24 | 23160 | ○ | ○ | Present Invention Example |

INDUSTRIAL APPLICABILITY

The present invention can be preferably applied to components in uses for hot dip galvanizing and working such as bending working, among components needing strength, such as structural members and reinforcement members for automobiles, construction machines, and the like and can be applied particularly to components needing the excellent adhesiveness of a plated layer.

The invention claimed is:

1. A galvannealed layer formed directly on a surface of a base steel sheet,
    wherein the average amount of Fe in the galvannealed layer is in a range of 8.0 to 12.0%; and
    wherein the absolute value of a difference (ΔFe) between the amount of Fe at a position of ⅛of the thickness of the galvannealed layer and the amount of Fe at a position of ⅞of the thickness of the galvannealed layer in the galvannealed layer, the thickness being from an interface between the galvannealed layer and the base steel sheet to the external surface of the galvannealed layer, is in a range of 0.3 to 3.0%, wherein the base steel sheet comprises a volume fraction of 10-50% bainitic ferrite and/or bainite.

2. A galvannealed steel sheet, wherein the galvannealed layer according to claim 1 is formed on a surface of a base steel sheet comprising a volume fraction of 10-50% bainitic ferrite and/or bainite, and further comprising, in mass %,
C: 0.050 to 0.300%,
Si: 0.10 to 2.50%,
Mn: 0.50 to 3.50%,
P: 0.001 to 0.030%,
S: 0.0001 to 0.0100%,
Al: 0.005 to 1.500%,
O: 0.0001 to 0.0100%,
N: 0.0001 to 0.0100%, and
the balance of Fe and unavoidable impurities.

3. The galvannealed steel sheet according to claim 2, wherein the base steel sheet further comprises, in mass %, one or more selected from
Cr: 0.01 to 2.00%,
Ni: 0.01 to 2.00%,
Cu: 0.01 to 2.00%,
Ti: 0.005 to 0.150%,
Nb: 0.005 to 0.150%,
V: 0.005 to 0.150%,
Mo: 0.01 to 1.00%, and
B: 0.0001 to 0.0100%.

4. The galvannealed steel sheet according to any one of claim 2 or claim 3, wherein the base steel sheet further comprises 0.0001 to 0.5000% in total of one or two or more selected from Ca, Ce, Mg, Zr, Hf, and REM.

5. The galvannealed steel sheet according to any one of claim 2 or claim 3, wherein a coating comprising a P oxide and/or a complex oxide containing P is formed on a surface of the galvannealed layer.

6. The galvannealed steel sheet according to claim 4, wherein a coating comprising a P oxide and/or a complex oxide containing P is formed on a surface of the galvannealed layer.

7. A method for producing a galvannealed layer, the method comprising:
a hot dip galvanizing step for subjecting a surface of a base steel sheet to hot dip galvanizing to obtain a hot dip galvanized steel sheet;
an alloying treatment step for heating a hot dip galvanized layer, formed in the hot dip galvanizing step, to a temperature in a range of 470 to 650° C. to form a galvannealed layer and to produce a galvannealed steel sheet; and
an intra-galvannealed-layer diffusion treatment step for, after the alloying treatment step, allowing the galvannealed steel sheet to stay at a temperature in a range of 250 to 450° C. and subjecting the galvannealed steel sheet to one or more times of bending-unbending working in the temperature range to diffuse Fe in the galvannealed layer,
wherein the base steel sheet comprises a volume fraction of 10-50% bainitic ferrite and/or bainite, wherein the galvannealed steel sheet is obtained, in which, after the intra-galvannealed-layer diffusion treatment step, the average amount of Fe in the galvannealed layer is in a range of 8.0 to 12.0%; and
wherein the absolute value of a difference (ΔFe) between the amount of Fe at a position of ⅛ of the thickness of the galvannealed layer and the amount of Fe at a position of ⅞ of the thickness of the galvannealed layer in the galvannealed layer, the thickness being from an interface between the galvannealed layer and the base steel sheet to the external surface of the galvannealed layer, is in a range of 0.3 to 3.0%.

8. The method for producing a galvannealed layer according to claim 7, wherein in the intra-galvannealed-layer diffusion treatment step, the bending working is performed so that a maximum tensile strain amount in a surface of the steel sheet ranges from 0.0007 to 0.0910.

9. The method for producing a galvannealed layer according to claim 7, wherein a surface of the galvannealed layer is subjected to phosphate coating treatment for forming a coating comprising a P oxide and/or a complex oxide containing P after the intra-galvannealed-layer diffusion treatment step.

10. The method for producing a galvannealed layer according to claim 7, wherein the base steel sheet comprises, in mass %,
C: 0.050 to 0.300%,
Si: 0.10 to 2.50%,
Mn: 0.50 to 3.50%,
P: 0.001 to 0.030%,
S: 0.0001 to 0.0100%,
Al: 0.005 to 1.500%,
O: 0.0001 to 0.0100%,
N: 0.0001 to 0.0100%, and
the balance of Fe and unavoidable impurities.

11. The method for producing a galvannealed layer according to claim 10, wherein the steel sheet further comprises, in mass %, one or more selected from
Cr: 0.01 to 2.00%,
Ni: 0.01 to 2.00%,
Cu: 0.01 to 2.00%,
Ti: 0.005 to 0.150%,
Nb: 0.005 to 0.150%,
V: 0.005 to 0.150%,
Mo: 0.01 to 1.00%, and
B: 0.0001 to 0.0100%.

12. The method for producing a galvannealed layer according to claim 10, wherein the base steel sheet further comprises, in mass %, 0.0001 to 0.5000% in total of one or more selected from Ca, Ce, Mg, Zr, Hf, or REM.

* * * * *